US012434233B2

(12) United States Patent
Kneucker et al.

(10) Patent No.: US 12,434,233 B2
(45) Date of Patent: Oct. 7, 2025

(54) PIPETTING DEVICE

(71) Applicant: BRAND GMBH + CO KG, Wertheim (DE)

(72) Inventors: Ottmar Kneucker, Helmstadt (DE); Markus Kurz, Wertheim (DE); Florian Metz, Waldbüttelbrunn (DE); Dieter Böhm, Wertheim (DE)

(73) Assignee: BRAND GMBH + CO KG, Wertheim (DE)

( * ) Notice: Subject to any disclaimer, the term of this patent is extended or adjusted under 35 U.S.C. 154(b) by 624 days.

(21) Appl. No.: 17/852,431

(22) Filed: Jun. 29, 2022

(65) Prior Publication Data

US 2023/0001403 A1 Jan. 5, 2023

(30) Foreign Application Priority Data

Jul. 2, 2021 (DE) ......................... 102021117126.1

(51) Int. Cl.
*B01L 3/02* (2006.01)

(52) U.S. Cl.
CPC ........... *B01L 3/0224* (2013.01); *B01L 3/0237* (2013.01); *B01L 2300/025* (2013.01); *B01L 2400/0478* (2013.01)

(58) Field of Classification Search
None
See application file for complete search history.

(56) References Cited

U.S. PATENT DOCUMENTS

| | | | | |
|---|---|---|---|---|
| 5,531,131 | A | 7/1996 | Sabloewski | |
| 8,133,453 | B2 | 3/2012 | Molitor | |
| 9,630,174 | B2 | 4/2017 | Sarna et al. | |
| 11,318,457 | B2 | 5/2022 | Döbele | |
| 2010/0266453 | A1 * | 10/2010 | Rylski .................. | B01L 3/0224 422/516 |
| 2013/0233095 | A1 | 9/2013 | Wilmer | |
| 2019/0083971 | A1 | 3/2019 | Schiraga | |

FOREIGN PATENT DOCUMENTS

| | | | |
|---|---|---|---|
| DE | 102012003846 | A1 | 8/2013 |
| DE | 102020002780 | B3 | 10/2021 |

* cited by examiner

*Primary Examiner* — P. Kathryn Wright
(74) *Attorney, Agent, or Firm* — Calderon Safran & Wright P.C. David S. Safran

(57) ABSTRACT

A pipetting device for taking up and dispensing fluid volumes has a displacement device with a displacement mechanism and a displacement housing. The pipetting device has an adjusting device for changing the stroke of the displacement mechanism. The stroke of the displacement mechanism can be adjusted, and the corresponding adjustment value can be displayed by an adjustment indicator. A coupling device, in a use state, couples the adjusting device to a volume indicator and decoupled the adjustment device from the adjustment indicator. In an adjustment state, the adjusting device is coupled to the adjustment indicator and is decoupled from the volume indicator. The adjustment indicator displays an adjustment value for the stroke of the displacement means. The adjustment indicator can be adjusted in an adjustment state, whereas it is fixed in a use state.

20 Claims, 16 Drawing Sheets

PIPETTING DEVICE

BACKGROUND OF THE INVENTION

Field of the Invention

The invention relates to a pipetting device for taking up and dispensing fluid volumes, comprising a displacement device, in particular a piston-cylinder arrangement.

Description of the Related Art

A pipetting device has a displacement device to which a pipette tip can be attached, preferably in an air-tight manner The pipette tip can be separated from the displacement device again. The displacement device and the pipette tip can together form a sealed air space.

The displacement device changes the volume of the air space, allowing liquid to be aspirated into and dispensed from the pipette tip. A pipetting device may have multiple displacement devices with respective pipette tips. The displacement device may be operated manually or by means of a motor. The pipetting device may also be hand-held or part of an automated laboratory apparatus.

The displacement device can be designed in particular as a piston-cylinder arrangement and then has a cylinder and a piston. The piston is movable in the cylinder by means of a drive device, wherein a movement of the piston is limited by an upper stop, a lower stop and at least one counter stop of the drive device and/or of the piston, so that a stroke of the piston is defined. The pipetting volume, i.e., the amount of liquid taken up or dispensed, depends on the stroke of the piston, but the stroke volume of the piston in the air space typically deviates from the pipetting volume. In pipetting devices with adjustable pipetting volume, the stroke of the piston, in particular the position of the upper stop, can be changed by means of an adjusting device.

Pipetting devices of the type in question have a volume indicator for indicating the pipetting volume. In one state of use, the adjusting device is coupled to the volume indicator, whereby an actuation of the adjusting device (and thus a change in the stroke of the piston) causes a change in the volume indicator.

Now, the value displayed by the volume indicator may deviate from the actual pipetting volume. The deviation depends, for example, on the density and viscosity of the liquid, the temperature, the air pressure and wetting effects. Such deviations should always be avoided. There are two ways to eliminate or at least reduce the deviation.

On the one hand, the volume indicator can be changed without changing the stroke of the piston. For this purpose, the actual pipetting volume must be determined, which causes considerable effort. In most cases, the transferred pipetting volume is weighed, wherein a wide variety of environmental conditions must be considered. Often this type of adjustment of the volume indicator is carried out by the manufacturer under standard conditions following manufacture or repair (Factory calibration).

On the other hand, the stroke of the piston can be changed without changing the volume indicator. Extensive documentation is available on the extent to which the stroke of the piston should be changed and under which conditions. This can be done quite easily by the user (user adjustment). However, this requires a well-defined starting point (initial stroke of the piston). Again, the factory calibration is used for this purpose.

A piston-stroke pipette for exchangeable pipette tips of the type described above is known from European Patent Application EP 1 743 701 A1 and from corresponding U.S. Pat. No. 8,133,453 B2. This known piston-operated pipette has a holder holding the lower stop, an overtravel spring between the lower stop and the holder, an adjusting device for adjusting the position of the holder with respect to the cylinder, and an indicator device for indicating the position of the holder. If the known piston-stroke pipette is designed with adjustable pipetting volume, it has a separate volume adjusting device for changing the position of the upper stop. The volume setting device is coupled via a gear to a counter for indicating the volume setting.

An adjustment of the known piston-operated pipette by the user is carried out exclusively by adjusting the lower stop, namely by means of the adjusting device for setting the position of the holder. The positioning of the upper stop performed during factory calibration is therefore not changed. A disadvantage is that the adjustment is carried out by means of a further adjusting device which changes the piston stroke. The holder to be repositioned in this process is held in the housing of the known piston-stroke pipette by a threaded connection. This further threaded connection does not represent a rigid connection to the housing. Depending on the temperature and the forces that occur, this threaded connection is a source of error for the piston stroke and the volume accuracy. Furthermore, the user must operate an additional adjusting device.

A check and correction of the factory calibration can be made by adjusting the position of the upper stop. To do this, insert a screwdriver blade into a notch on the outside of an adjustment block and, by moving a set of gears, uncouple the volume adjusting device from the counter for displaying the volume setting. In this unstable condition, the position of the upper stop can then be changed. This adjustment is not very convenient for the user and also requires a delicate procedure, thus increasing the likelihood of errors occurring or even damage to the piston-stroke pipette during this adjustment option. This adjustment option is also not intuitive for the user.

SUMMARY OF THE INVENTION

The task of the present invention is to improve the manageability, the precision, the procedure as well as the reliability when adjusting and/or calibrating a pipetting device.

The above task is solved by a pipetting device in accordance with the present invention as described below.

The pipetting device according to the present invention, for taking up and dispensing fluid volumes has a displacement device, a drive device, a volume indicator, an adjusting device, an adjustment indicator, and a coupling device.

The displacement device has a displacement means, in particular a piston, and a displacement housing, in particular a cylinder. In particular, the displacement device is designed as a piston-cylinder arrangement.

Furthermore, the drive device is designed to move the displacement means in the displacement housing, wherein a movement of the displacement means is limited by an upper stop, a lower stop and at least one counter stop of the drive device and/or of the displacement means, so that a stroke of the displacement means is defined.

The volume indicator is designed to display a pipetting volume associated with the stroke of the displacement means and/or correlating with the stroke of the displacement means. Ultimately, the stroke of the displacement means can specify the pipetting volume to be accommodated, so that the pipetting volume ultimately correlates to or is assigned to the stroke. The volume indicator thus enables the user to see the pipetting volume. The indication can be provided in different ways, for example by an analog or digital display.

The adjusting device, in turn, is designed to change the stroke of the displacement means, in particular to change the position of the upper stop.

The adjustment indicator is designed to indicate and/or preset and/or set an adjustment value of the stroke of the displacement means. Such an adjustment value results from the fact that the stroke and the pipetting volume are adjusted in such a way that the volume indicator can reference the actually and/or at least essentially actually dispensed pipetting volume. The adjustment value specifies the extent to which any deviations are to be considered.

The coupling device according to the invention is now designed in such a way that it can be transferred into a use state and into an adjustment state. Such a transfer can be affected by an actuation, in particular by an exerted force. In particular, the coupling device can be operated and/or actuated by the user of the pipetting device.

In the use state, the adjusting device is coupled to the volume indicator and decoupled from the adjustment indicator, whereby actuation of the adjusting device causes a change in the volume indicator but not in the adjustment indicator. Thus, in the use condition, the user can adjust and change the pipetting volume, and this change can be indicated by the volume indicator. Therefore, the adjusting device, which allows an adjustment of the stroke of the displacement means and thus in particular of the upper stop, is coupled to the volume indicator. The volume indicator shows the size of the pipetting volume correlating to the stroke of the displacement.

In the adjustment state, the adjusting device is coupled to the adjustment indicator and decoupled from the volume indicator. Thus, an actuation of the adjusting device causes a change of the adjustment indicator but not of the volume indicator. Such an actuation can, for example, be caused by an applied force, in particular a force applied by the user. Therefore, in the adjustment state, a change in the upper stop and/or the stroke of the displacement means does not cause a change in the volume indicator. Such an adjustment in the adjustment state can therefore be made when an adaptation to the ambient conditions and/or to the actually dispensed pipetting volume is to be made. In the following, the adjustment and/or the adjustment state is understood to mean that the user, by setting or by changing the adjustment indicator, which can be achieved by actuating the adjusting device, can cause a change in the stroke of the displacement means, which in turn correlates to the pipetting volume. For this purpose, the user can, for example, change the adjustment value of the adjustment indicator, which in turn can lead to a change in the upper stop via the adjusting device and thus has an influence on the stroke of the displacement medium and also on the pipetting volume to be dispensed and aspirated.

In principle, it can be left to the user which degree of change of the adjustment indicator he uses. However, it is also possible to specify to the user which setting is required via the adjustment indicator for which ambient conditions and/or which fluid volumes.

Advantageously, the user can use the familiar volume adjustment mechanism with the adjusting device to change the stroke during user adjustment, which enables ergonomic and precisely metered adjustment.

The invention enables convenient and safe switching from the use state to the adjustment state and vice versa.

In particular, it is not necessary to change the lower stop for setting the volume indicator, so that the lower stop can be arranged in a proven and/or known manner In particular, the lower stop can be used stably in the proven direct interaction with the housing (without a threaded connection.).

In particular, the arrangement according to the invention now makes it possible in a comparatively simple manner for the user to adjust the pipetting device to the ambient conditions and/or the fluid to be pipetted before and/or after using the pipetting device, and/or to adjust and/or tune the pipetting device to this via the adjustment state.

In the use state, the user can then use the pipetting device in a manner known to him, wherein the volume displayed via the volume indicator can then also correspond at least essentially to the volume actually dispensed and aspirated. A "conversion" of the pipetting volume displayed via the volume indicator is then not necessary. This is user-friendly and thus also reduces any sources of error that may arise and/or exist when operating the pipetting device.

Ultimately, in the state of use, actuating the adjusting device causes a change in the stroke of the displacement means and a change in the volume indicator. The adjustment indicator is not changed. In the adjustment state, on the other hand, actuation, for example by an applied force, of the adjusting device causes a change in the stroke of the displacement means and a change in the adjustment indicator. However, the volume indicator is not changed in the adjustment state.

Preferably, in the use state and in the adjustment state, the adjusting device is coupled to the upper stop, whereby an actuation of the adjusting device, in particular by an applied force, causes a change in the position of the upper stop. In particular, a force exerted on the adjusting device to actuate the adjusting device is transmitted to the upper stop. The change in position of the upper stop causes a change in the stroke of the displacement means and thus in the fluid volume to be dispensed and received.

In another particularly preferred embodiment of the idea of the invention, it is provided that in a calibration state the adjusting device is coupled to the volume indicator and decoupled from the upper stop and from the adjustment indicator, whereby an actuation of the adjusting device, in particular an applied force, causes a change in the volume indicator but not in the adjustment indicator and not in the position of the upper stop. Such a calibration condition can be performed at the manufacturing plant, for example, and thus can also be referred to as "factory calibration." Thus, the volume indicator can be adjusted to the stroke of the displacement means. This adjustment or such possible adjustment can thus be used for "original calibration". The calibration state is initially independent of the adjustment state and, in particular, is not used by the user. However, the pipetting device and/or the coupling device is designed to assume such a calibration state. Accordingly, the accuracy and the reliability of the operation of the pipetting device can be further improved and/or adapted.

Furthermore, in another preferred embodiment, it is provided that the coupling device has at least one first coupling means coupled to the adjusting device, which is designed in particular as a first gear wheel. In addition, the coupling device can have a second coupling means that can be coupled to the volume indicator, which is designed in particular as a second gear wheel. Alternatively, or additionally, the coupling device can comprise a third coupling means which can be coupled to the adjustment indicator and which is preferably designed as a third gear wheel. The coupling means of the coupling device can be coupled to the respective volume indicator and adjustment indicator in the use state and in the adjustment state and thus enable an adjustment.

Preferably, the first coupling means, the second coupling means and the third coupling means are arranged to rotate about a common axis of the coupling device and to be along this common axis. Thus, the coupling means of the coupling device can be displaced, actuated and/or rotated together. In this context, it is understood that the coupling means may be formed differently with respect to each other—for example, may have a different diameter. Furthermore, the aforementioned coupling means can be arranged in such a way that, on the one hand, in the use state of the coupling device the second coupling means is coupled to the volume indicator and, on the other hand, in the adjustment state the second coupling means is decoupled from the volume indicator. On the other hand, in the adjustment state, the third coupling means may be coupled to the adjustment indicator, and in the use state, the third coupling means is not coupled to the adjustment indicator. In addition, the coupling means can be designed in such a way that the first coupling means can be coupled or is coupled to the adjustment means both in the use state and in the adjustment state.

In addition, the coupling means may be such that in the calibration state the third coupling means is not coupled to the adjustment indicator.

Preferably, the adjustment indicator has at least one number wheel that can be rotated about a longitudinal axis of the pipetting device and displays a scale for an adjustment value of the stroke of the displacement means. The aforementioned longitudinal axis of the pipetting device, about which the number wheel is rotatable, forms in particular the axis of rotation of the number wheel. Furthermore, the aforementioned longitudinal axis of the pipetting device is arranged in particular parallel to the central axis of the pipetting device, which in particular forms an approximate axis of symmetry of the pipetting device.

In particular, the number wheel of the adjustment indicator is accessible from the outside by a user and/or visible to a user. By actuating the adjusting device, in particular by turning an adjusting means of the adjusting device, the adjustment indicator and the displayed adjustment value can be adjusted in the adjustment state. Via the adjusting device, which interacts with the adjustment indicator, a change in the stroke of the displacement means, preferably by changing the position of the upper stop, can be made in the adjustment state. Furthermore, the number wheel can also have a scale so that a high degree of accuracy can be ensured when adjusting the adjustment indicator.

For adjusting the adjustment indicator, in particular rotating about the longitudinal axis of the pipetting device, by means of the adjusting device via the coupling device, the adjustment indicator can have an adjustment toothing which can be engaged and disengaged with a complementary adjustment toothing of the coupling device.

Preferably, the pipetting device has an actuating element for adjusting the coupling device. Particularly preferably, the actuating element is accessible from the outside, in particular by a user of the pipetting device. For example, the actuating element can be arranged to be displaced longitudinally—i.e., in particular, to be displaced along a longitudinal axis of the pipetting device. The actuating element is designed in such a way that adjusting the coupling device by means of the actuating element enables a change between the use state and the adjustment state. Thus, the actuating element can enable a change between the use state and the adjustment state in a simple manner In particular, no further tools are required for operating the actuating element, so that in particular the actuating element can be operated without tools—for example, by the hand of a user. Accordingly, a convenient and safe switching to the adjustment state is made possible.

In another preferred embodiment of the invention, the coupling device has an engagement means for changing the position of the coupling device. In particular, the engagement means is designed to allow axial displacement of the coupling device along the common axis of the coupling device. In particular, the engagement means may be movable along a longitudinal axis of the pipetting device—i.e., at least substantially in the longitudinal direction of the pipetting device. Preferably, the engagement means can be arranged in different end positions—driven by the actuating element. The engagement means can have different formations and can in particular cooperate with the second coupling means. For example, the engagement means can be designed in such a way that it engages around the second coupling means at least in certain areas.

In particular, a longitudinal displacement of the actuating element causes a longitudinal displacement of the engagement means. The actuating element can be displaced by a user from a first position, in which the coupling device causes the use state, along the longitudinal axis of the pipetting device into a second position, in which the coupling device causes the adjustment state.

The actuating element can be designed in one or more parts. It is preferred if the actuating element has a grip part that is accessible from the outside and can be gripped by a user of the pipetting device, in particular by means of at least one finger. When the user exerts a force on the grip part, the actuating element (including the grip part) can be moved, in particular shifted, so that the coupling device is adjusted. The grip part can be designed as an integral or separate part of the actuating element.

Preferably, the engagement means and the actuating element are connected to one another in a fixed manner, in particular in a rotationally fixed manner Ultimately, the engagement means enables the force applied when actuating the actuating element to be transmitted to the coupling device, in particular to the second coupling means.

In a preferred embodiment, the actuating element is designed separately from the adjusting device. Provision can be made here for the engagement means and the actuating element to be designed in one piece with each other.

If the actuating element is designed separately from the adjusting device and fixedly connected to the engagement means, it is preferably provided that a restoring force of a restoring means of the pipetting device, in particular the spring force of a spring, acts on the actuating element and/or the engagement means. The restoring force of the restoring means counteracts a displacement of the actuating element from the first position (use state) into the second position (adjustment state). If the user does not exert any force on the actuating element in the second position (e.g., if the user releases the actuating element), the restoring force of the restoring means causes a longitudinal displacement of the actuating means from the second position to the first position. In this case, the engagement means is displaced together and concurrently with the actuating element. In other words, the restoring means causes the coupling device to be automatically reset from the adjustment state to the use state when the actuating element is released in the adjustment state. The adjustment state is retained as long as the actuating element is held in the second position. This prevents accidental pipetting with the pipetting device in the adjustment state. This construction also enables simple, intuitive operation without tools. This saves time when using the pipetting device and improves the handling of the pipetting device.

As an alternative to the previously explained embodiment, it can be provided that the spring force of a spring means of the pipetting device acts on the engagement means when moving between the first and the second position only along a section. In particular, the spring means can be arranged on the engagement means and/or on the actuating element. In particular, the spring means can enable improved force transmission from the actuating element to the engagement means. In particular, the spring means facilitates the operation of the actuating element, wherein, on the one hand, the interlocking of the corresponding coupling means is enabled and, on the other hand, the adjustment state can thus be assumed only temporarily. In this embodiment, too, the state of use is "automatically" assumed by the spring means after the load has ceased.

In a further embodiment, the adjusting device comprises the actuating element, in particular an adjustment sleeve of the adjusting device can form the actuating element. This embodiment represents in particular an alternative to the previously described embodiment with an actuating element separate from the adjusting device. In this further embodiment, the adjustment sleeve (and thus the actuating element) is designed to change the stroke of the displacement means and to change the volume indicator and is designed to be rotatable about a longitudinal axis of the pipetting device for this purpose. As an actuating element, the adjustment sleeve is also designed for adjusting the coupling device to the use state and/or adjustment state and is movable along the longitudinal axis of the pipetting device for this purpose. The movement of the adjustment sleeve can be initiated in particular by an external intervention, preferably by a user of the pipetting device.

Preferably, the adjustment sleeve and the engagement means are rotatably mounted relative to each other and/or longitudinally displaceably connected.

In a further preferred embodiment, it is provided that the adjustment sleeve can be releasably fixed in various positions by a holding device of the pipetting device, which can also facilitate operation. By fixing the adjustment sleeve by means of the holding device, an undesired release of the adjustment sleeve as an actuating element and thus an undesired switching into a possible state (either use or adjustment state) can be avoided.

In a particularly preferred embodiment, which is especially advantageous in the one-piece design of the externally accessible actuating element and the engagement means, it is provided that for coupling the engagement means to the adjusting device, the engagement means has a coupling element and the adjusting device has a counter-coupling element. In particular, the coupling element and the counter-coupling element are designed in such a way that, during the transition from the use state to the adjustment state and/or from the adjustment state to the use state, a rotational movement of the adjusting device, in particular of the adjustment sleeve of the adjusting device, can be blocked. In this context, it can be provided that a blocking of the rotary movement is provided in such a way that a rotation of the adjusting device, in particular of the adjustment sleeve, is only made possible again in the adjustment state. Thus, the adjusting device can be blocked during the transition and/or switching from the use state to the adjustment state and/or from the adjustment state to the use state. Thus, unintentional rotational movements, which in particular cause an undesired meshing of the gears forming in particular a transmission, can be avoided. For example, it can be prevented that—undesirably—a toothing of the adjusting device gets caught and/or jammed with the first coupling element.

In the use state, the adjustment indicator is decoupled from the adjusting device and is not engaged with the coupling device. In this use state, adjustment of the adjustment indicator is to be avoided. According to a preferred embodiment, it is provided that the adjustment indicator is fixed in the use state, in particular secured against rotation about the longitudinal axis of the pipetting device. Preferably, the adjustment indicator is fixed in place by means of a locking toothing of the adjustment indicator and a complementary locking toothing on the actuating element. The actuating element is non-rotatable in relation to the longitudinal axis of the pipetting device and cannot be rotated in the circumferential direction. By actuating the actuating element, the locking toothing of the actuating element and the locking toothing of the adjustment indicator can be engaged and disengaged. In the use state, the locking toothing of the actuating element is in engagement with the locking toothing of the adjustment indicator. In this use state, this engagement prevents the adjustment indicator from being adjusted, in particular from being rotated. If the actuating element is switched from the use state to the adjustment state by actuating, in particular by moving it, the locking toothing of the actuating element and the locking toothing of the adjustment indicator are disengaged. In the adjustment state, the adjustment indicator is adjustable, in particular rotatable about the longitudinal axis of the pipetting device. Greater precision is advantageous here, since accidental adjustment of the adjustment indicator is not possible.

Another aspect that can also be implemented independently of the pipetting device explained above relates to a pipetting device for handling liquid involves the pipetting device having a displacement device, a drive device and an adjustment indicator.

The displacement device has a displacement means, in particular a piston, and a displacement housing, in particular a cylinder. In particular, the displacement device is designed as a piston-cylinder arrangement.

The drive device is designed to move the displacement means in the v housing, with a movement of the displacement means being limited by an upper stop, a lower stop and at least one counter-stop of the drive device and/or the displacement means, so that a stroke of the displacement means is defined.

The adjustment indicator is designed to display and/or specify or set an adjustment value for the stroke of the displacement means. Such an adjustment value results from the stroke and the pipetting volume being adjusted in such a way that the volume indicator can reference the pipetting volume that is actually or at least essentially actually dispensed. The adjustment value specifies the extent to which any deviations are to be taken into account.

In an adjustment state of the pipetting device, the stroke of the displacement means is adjustable and the adjustment indicator is adjustable, in particular rotatable about a longitudinal axis of the pipetting device. In a use state of the pipetting device, the stroke of the displacement means is adjustable and the adjustment indicator is fixed, in particular secured against rotation about the longitudinal axis of the pipetting device.

The pipetting device preferably has an actuating element, which is preferably accessible from the outside, for transferring the pipetting device from the use state to the adjustment state and vice versa. The actuating element can be moved along the longitudinal axis of the pipetting device to transfer the pipetting device from the use state to the adjusting state and vice versa. In relation to the longitudinal axis of the pipetting device, the actuating element is designed to be non-rotatable. The adjustment indicator has a locking toothing and the actuating element has locking toothing complementary thereto. By moving the actuating element along the longitudinal axis of the pipetting device, the locking toothing of the actuating element and the locking toothing of the adjustment indicator can be engaged and disengaged. In the use state, the locking toothing of the actuating element is in engagement with the locking toothing of the adjustment indicator. In the adjustment state, the locking toothing of the actuating element is disengaged from the locking toothing of the adjustment indicator.

The aforementioned aspects and features of the present invention, as well as the aspects and features of the present invention resulting from the further description, can be realized independently of each other, but also in any combination.

Further advantages, features, properties and aspects of the present invention will be apparent from the description below of preferred embodiments with reference to the accompanying drawings.

DETAILED DESCRIPTION OF THE INVENTION

In the figures, the same reference signs are used for the same or similar parts, achieving corresponding characteristics and advantages, even if a repeated description is omitted for simplicity.

Figure 1:
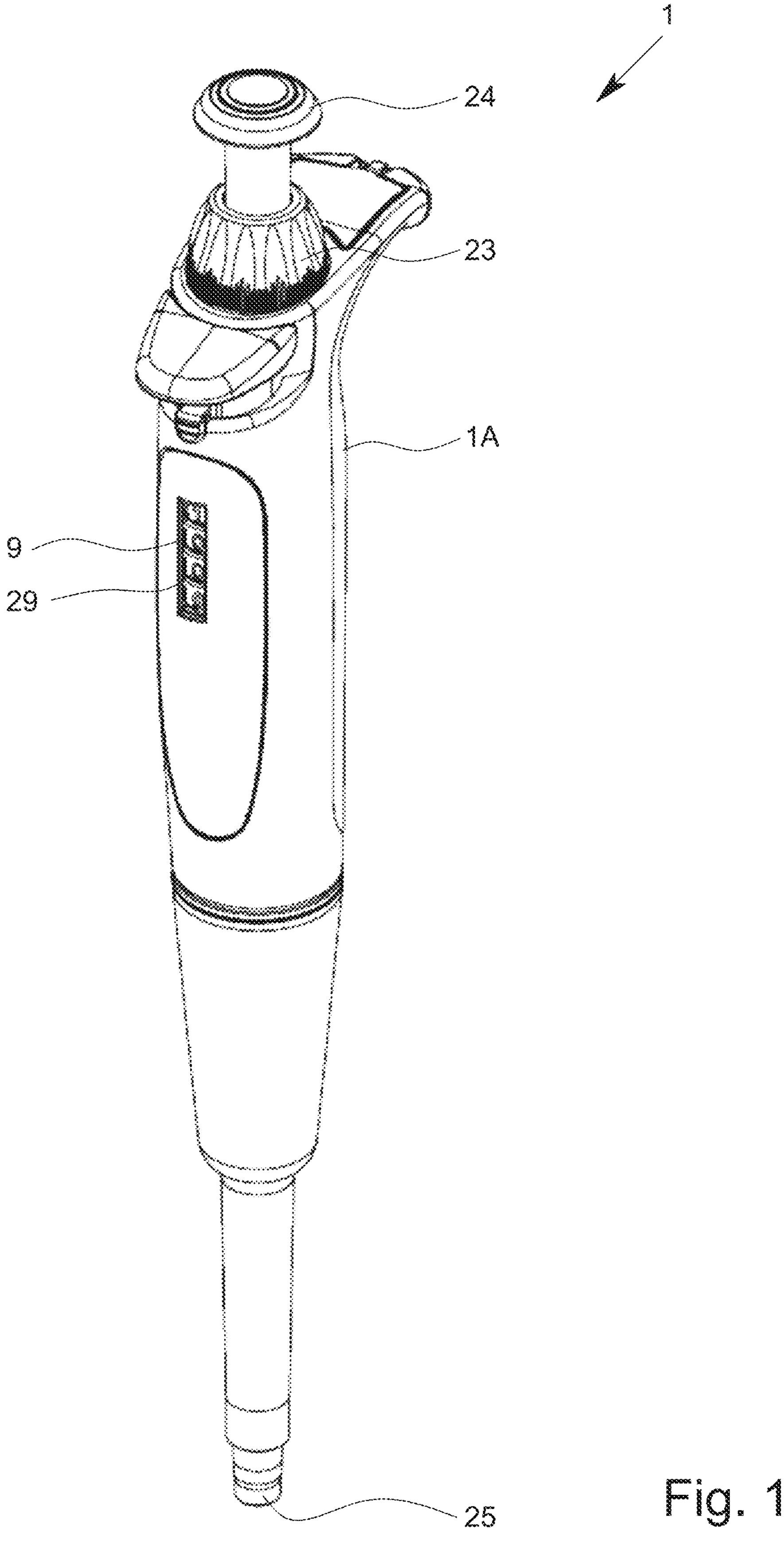
FIG. 1 is a schematic perspective view of a prior art pipetting device.
Figure 2:
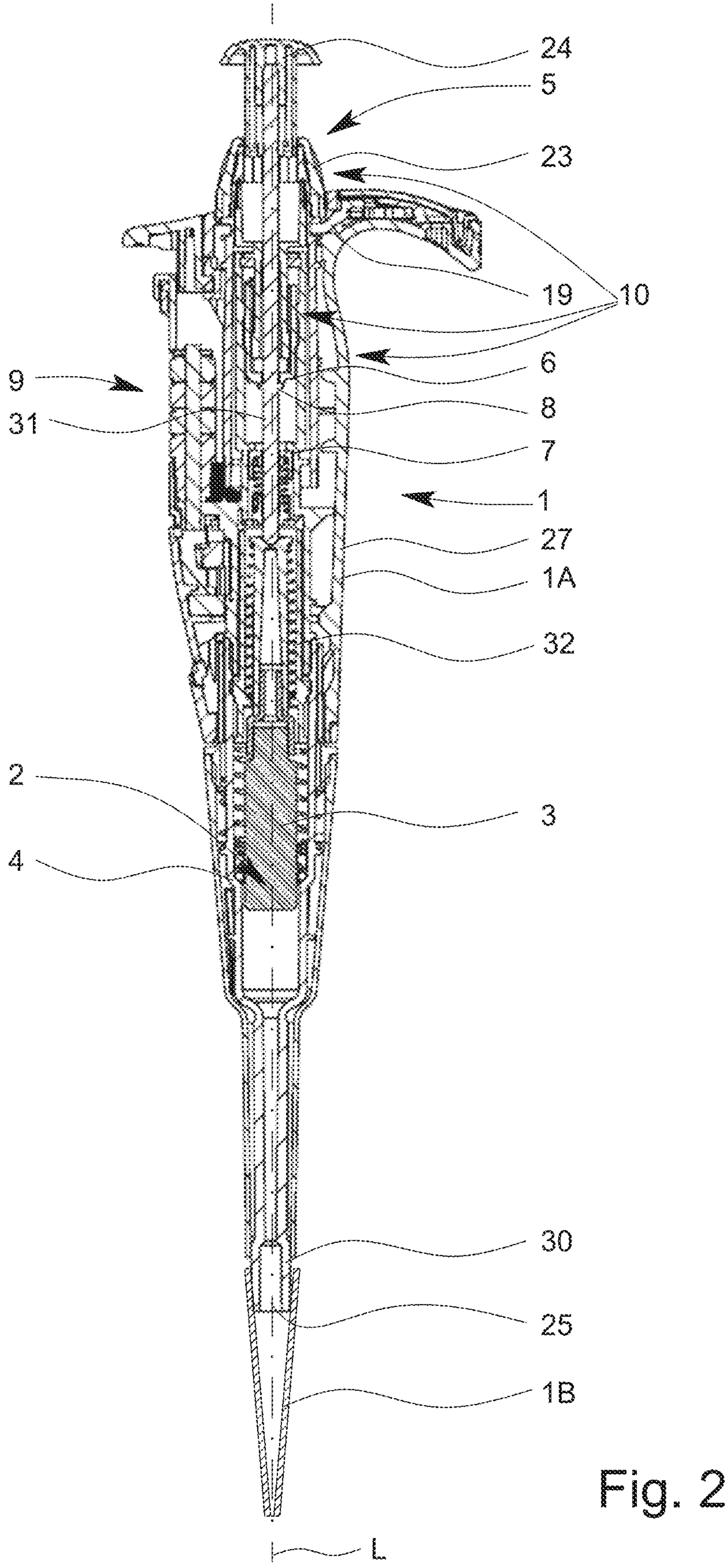
FIG. 2 is a schematic sectional view through the pipetting device according to FIG. 1 with a pipette tip attached to it.

FIG. 1 shows a prior art pipetting device 1 for aspirating and dispensing fluid volumes. The pipetting device 1 is held and guided at its housing 1A by hand or by a robot. FIG. 2 shows a schematic section through the pipetting device 1 shown in FIG. 1 with a pipette tip 1B attached to it.

In the following, with reference to FIGS. 1 and 2, features are explained which are designed in the same way in the pipetting device 1 of the prior art as in a pipetting device 1 according to the invention.

A pipetting device 1 according to the invention (as well as the pipetting device 1 of the prior art) has a displacement device 2. For the mode of operation of the displacement device 2, reference may be made to the sectional view shown in FIG. 2, the mode of operation of which can also be transferred to the embodiments according to the invention.

By means of the displacement device 2, a fluid, in particular a liquid, can be taken up into the pipette tip 1B and subsequently dispensed from it. The displacement device 2 has a displacement means 3 and a displacement housing 4. In the illustrated and preferred embodiment example, the displacement device 2 is designed as a piston-cylinder arrangement, so that the displacement means 3 is designed as a piston and the displacement housing 4 is designed as a cylinder.

The pipetting device 1 and/or the displacement device 2 preferably has an elongated shape and/or has a longitudinal axis L. The longitudinal axis L preferably runs centrally through the displacement device 2, in particular the displacement means 3 and the displacement housing 4.

When terms such as "axial", "axial direction" and the like are used in the following, this refers to the longitudinal axis L. Correspondingly, terms such as "radial", "radial direction" and the like also refer to the longitudinal axis L and indicate a direction perpendicular to the longitudinal axis L. When terms such as "top", "bottom" and the like are used in the following, this refers to the extension of the longitudinal axis L.

The displacement housing 4 forms a cavity which is open towards the pipette tip 1B and is otherwise gas-tight. The displacement means 3 is preferably movable axially and/or along the longitudinal axis L and with respect to the cavity. By means of the displacement means 3, the volume of the cavity can be varied so that fluid, in particular air, can be drawn into the cavity when the cavity is enlarged due to the resulting negative pressure and can be dispensed again and/or displaced from the cavity when the volume is reduced. The displacement means 3 is preferably sealed against the displacement housing 4, in particular by means of a seal.

The displacement device 2 preferably has a return means 32, in particular a return spring. By means of the return means 32, the displacement means 3 can be moved into an initial position, in particular into the position with maximum volume of the cavity, which corresponds to the suction direction of the fluid and/or the direction against the discharge direction of the fluid.

The displacement housing 4 preferably has and/or forms a shaft 30 of the pipetting device 1. The shaft 30 is used for detachably attaching the pipette tip 1B and has an opening 25 that connects the displacement housing 4 to the pipette tip 1B, as explained above.

A pipette tip 1B is a substantially conical tube with two opposing openings, each of which has a different cross-section. With the larger opening, the pipette tip 1B can be fitted onto the shaft 30 and forms a gas-tight connection. Liquid can then be drawn into the pipette tip 1B through the variable cavity and subsequently dispensed.

The pipetting device 1 has a drive device 5 for moving the displacement means 3 in the displacement housing 4. The drive device 5 has a drive rod 31. The drive rod 31 may extend axially and/or along the longitudinal axis L. The drive rod 31 is preferably movable in the axial direction and/or at least substantially parallel to the displacement means 3. The drive device 5 preferably comprises an operating element 24. In particular, the drive device 5 can be actuated via the operating element 24.

Actuating the operating element 24, in particular pressing it down, causes the drive rod 31 to be pressed against the displacement means 3, so that the displacement means 3 moves into the displacement housing 4 and reduces the volume of the cavity. Accordingly, fluid can be dispensed from the pipetting device 1, in particular via the shaft 30 and the pipette tip 1B, by actuating the drive device 5 and/or the operating element 24.

Unactuated, the displacement means 3 and the drive device 5 and/or the drive rod 31 and/or the operating element 24 automatically assume the initial position, in particular by means of the return by the return means 32.

Alternatively, or in addition to the operating element 24, automated and/or motorized operation of the displacement device 2 is also possible.

Preferably, a movement of the displacement means 3 is limited by an upper stop 6, a lower stop 7 and at least one counter stop 8 of the drive device 5 and/or the displacement means 3, so that a stroke of the displacement means 3 is defined. Preferably, the stroke of the drive device 5 and/or the drive rod 31 and/or the displacement means 3 can be changed by the upper stop 6 and/or the lower stop 7.

The counter stop 8 can in particular be formed as a stop section of the drive rod 31. In particular, the counter stop 8 is formed integrally with the drive rod 31 and/or extends from the drive rod 31 in the radial direction and/or is flange-like.

When the pipetting device 1, displacement device 2, drive device 5 and/or operating element 24 is actuated, in particular when the drive rod 31 is moved in the axial direction, the counter stop 8 preferably strikes the lower stop 7, which limits the axial movement and/or stroke movement.

When resetting the displacement device 2 and/or the drive device 5, in particular by means of the return means 32, there is preferably a stop between the counter stop 8 and the upper stop 6 in the intake direction, which limits the axial movement or stroke movement.

When the counter stop 8 stops against the upper stop 6, the unactuated state is preferably reached and/or the volume in the cavity is at a maximum. In particular, the maximum fluid volume that can be accommodated is determined by the position of the upper stop 6.

Preferably, the axial position of the upper stop 6 is adjustable so that the maximum fluid volume that can be accommodated or the volume of the cavity can be adjusted. For this purpose, the pipetting device 1 and/or the drive device 5 has an adjusting device 10. The adjusting device 10 can have an adjusting means 23. Preferably, a threaded connection is formed between the adjusting means 23 and the upper stop 6 and/or the adjusting means 23 has an internal thread and the upper stop 6 has a corresponding external thread. The threaded connection can be used to adjust the axial position of the upper stop 6 and thus the maximum volume that can be accommodated.

In addition to the adjusting means 23, the adjusting device 10 can have an adjustment sleeve 27 operatively connected to the adjusting means 23. Thus, the axial position of the upper stop 6 can also be adjusted by means of the adjustment sleeve 27, in particular by turning the adjustment sleeve 27.

The pipetting device 1 includes a volume indicator 9 disposed in the housing 1A. The volume indicator 9 may include a plurality of volume indicator wheels 29 (number wheels) for indicating a volume value through an opening or window in the housing 1A. The volume indicator 9 is driven by the adjusting device 10 and/or the adjusting means 23 and is configured to display a pipetting volume associated with and/or correlated to the stroke of the displacement means 3. When the volume indicator 9 is changed, in particular by actuating the adjusting device 10, individual volume indicator wheels 29 of the volume indicator 9 can be moved.

Figure 3:
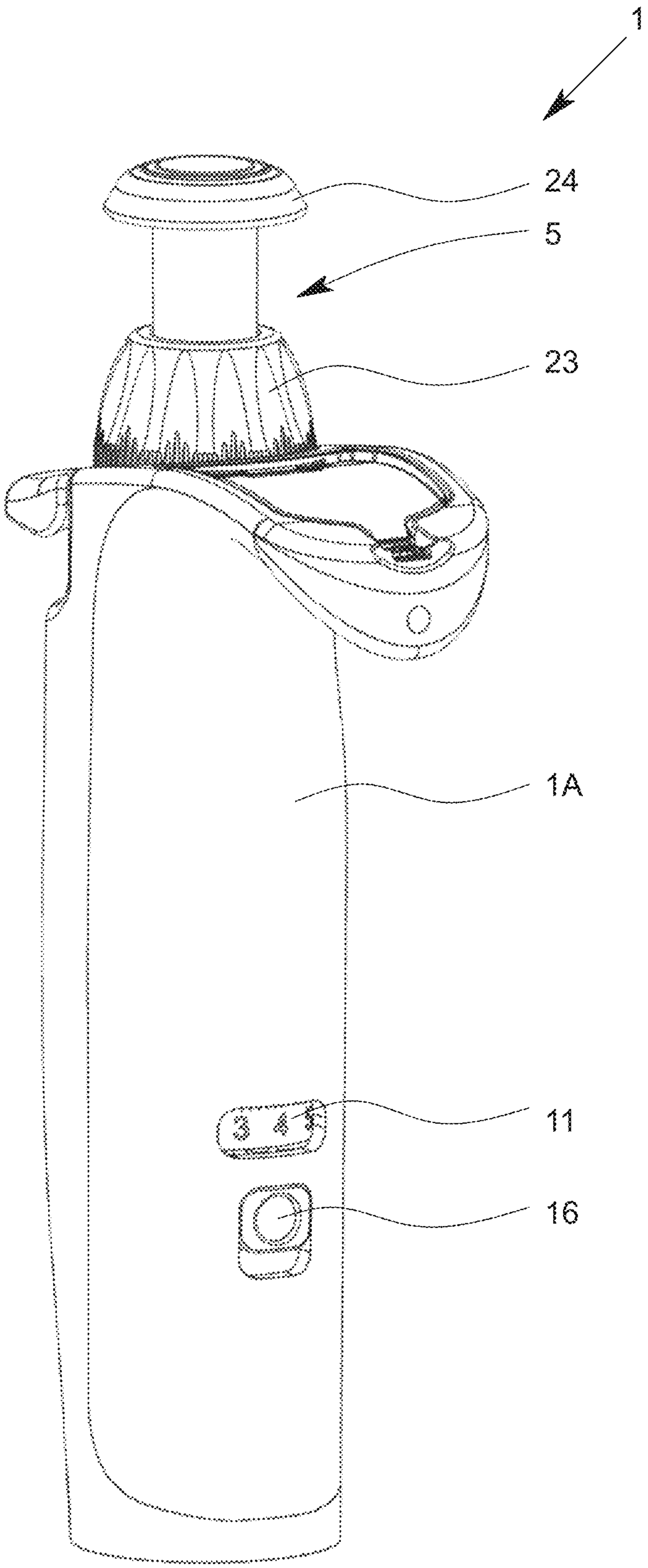
FIG. 3 is a schematic perspective view of a part of a pipetting device according to the invention.

In the following, features are explained which are designed differently in the pipetting device 1 according to the invention than in the pipetting device 1 of the prior art. Reference is first made to FIG. 3, which shows a schematic perspective view of a part of a pipetting device 1 according to the invention.

Figure 4:
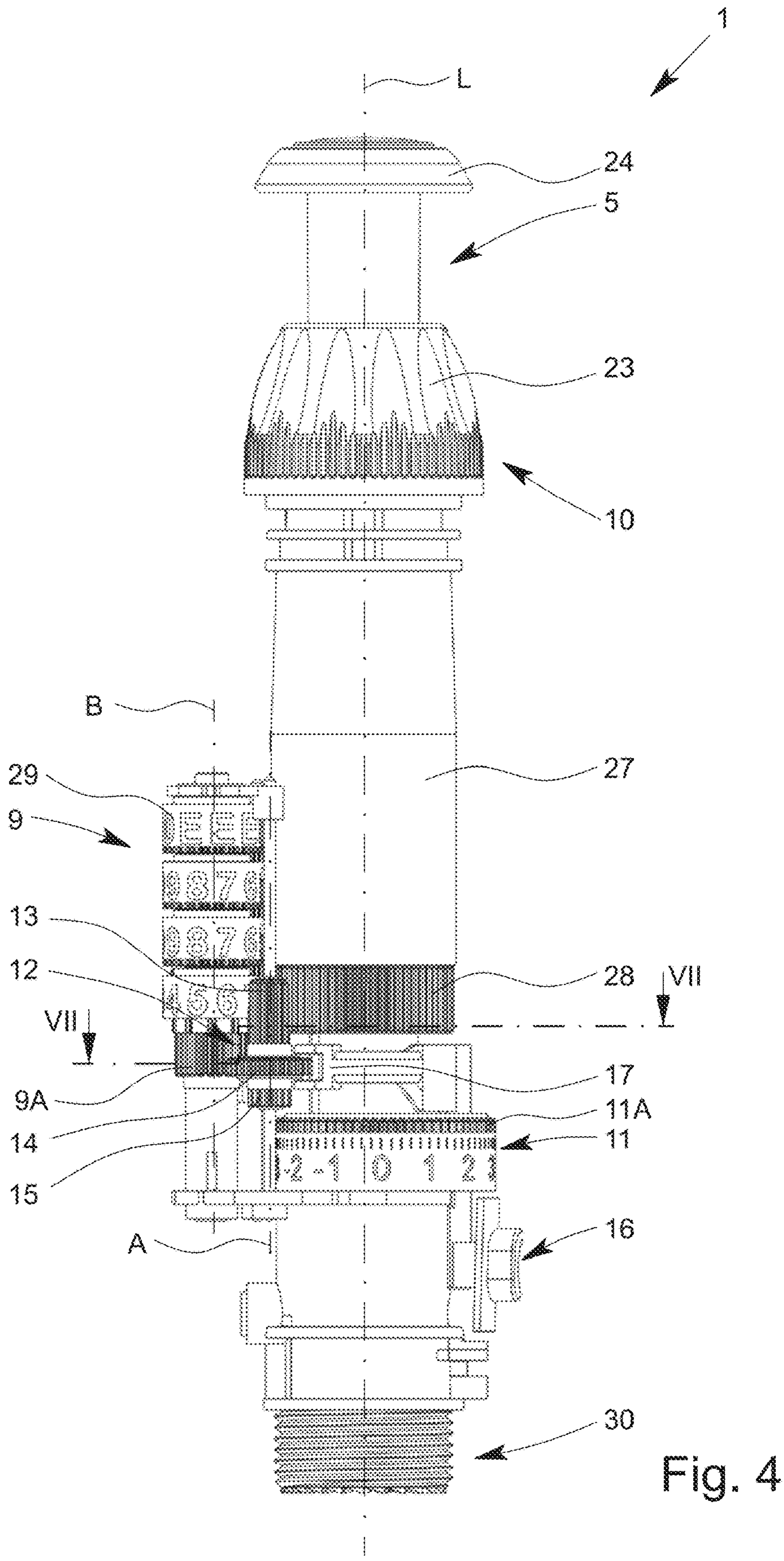
FIG. 4 is a schematic side view of the part of the pipetting device according to FIG. 3 in a state of use, but omitting a housing of the pipetting device.
Figure 5:
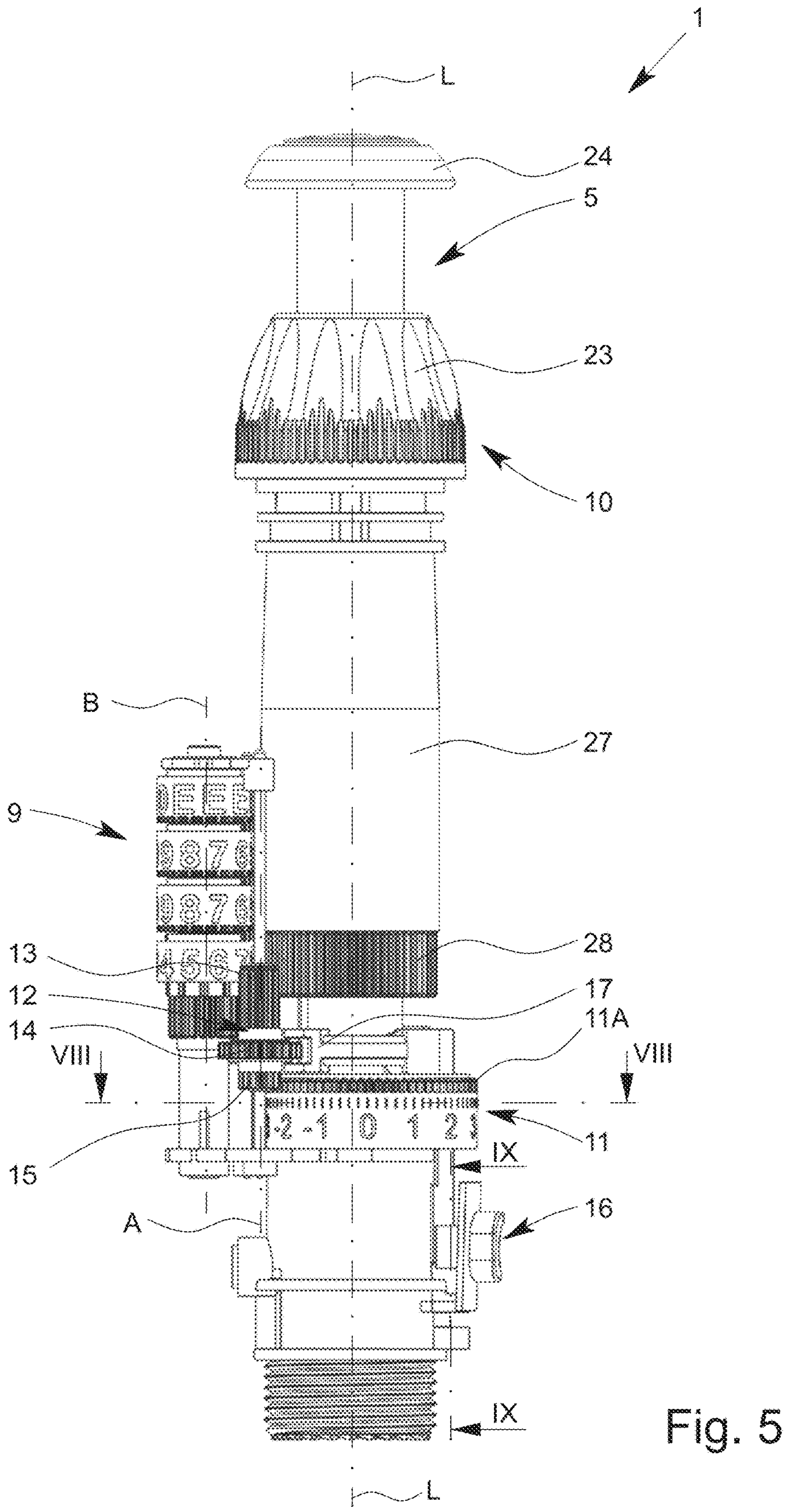
FIG. 5 is a schematic side view of the part of the pipetting device according to FIG. 3 in an adjustment state, but omitting a housing of the pipetting device.
Figure 6:
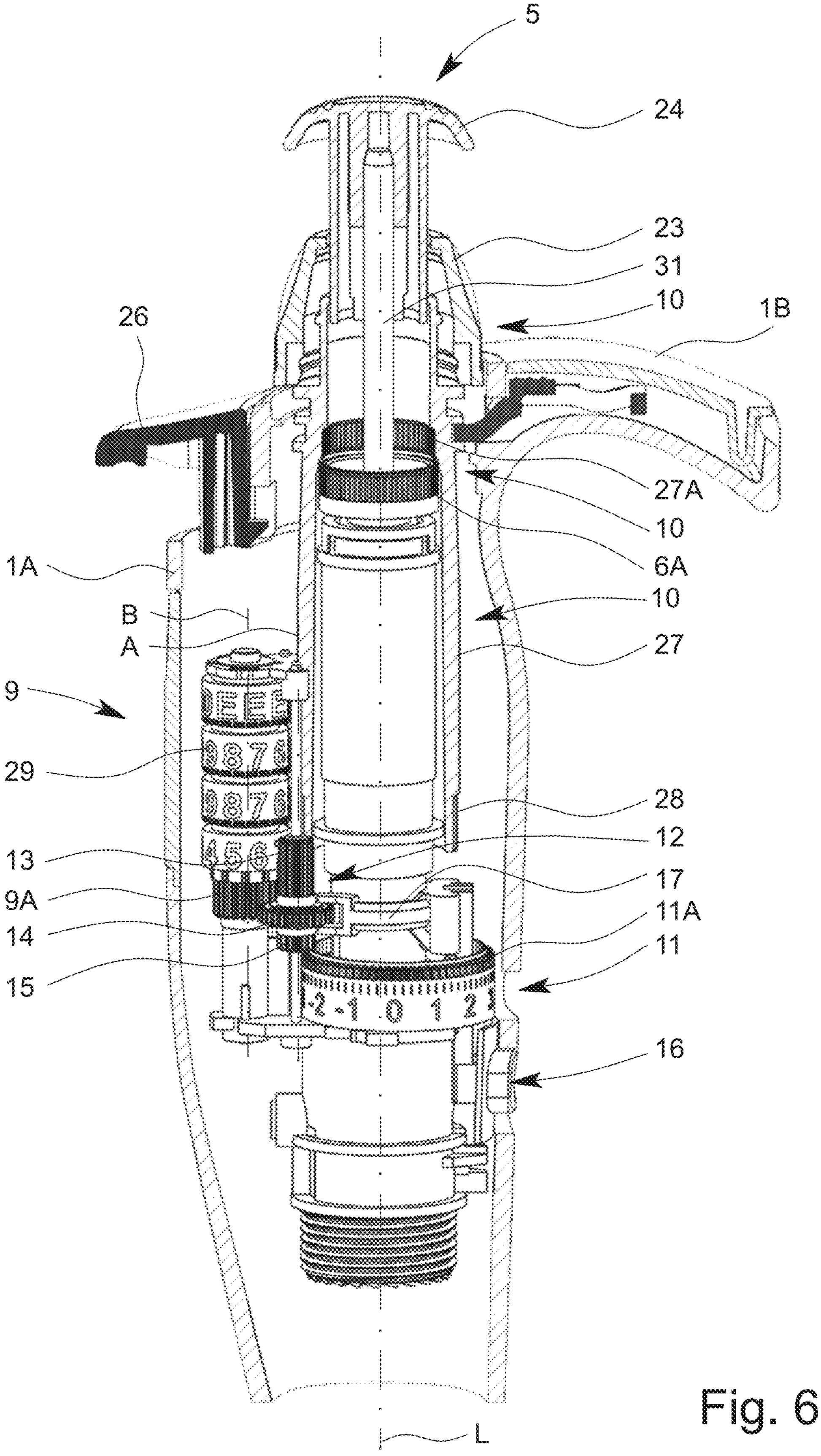
FIG. 6 is a schematic partial sectional view through the part of the pipetting device according to FIG. 3 in a calibration state.

FIG. 4 shows a schematic side view of the part of the pipetting device 1 according to FIG. 3 in a use state but omitting the housing 1A of the pipetting device 1. FIG. 5 shows a schematic side view of the part of the pipetting device according to FIG. 3 in an adjustment state but omitting the housing 1A of the pipetting device 1. FIG. 6 shows a schematic partial sectional view through the part of the pipetting device according to FIG. 3 in a calibration state. This partial sectional view does not run through all the components shown, since some components are to be shown in perspective for their explanation.

In the pipetting device 1 according to the invention, an adjustment indicator 11 for displaying an adjustment value of the stroke of the displacement means 3, which is not shown in FIGS. 3 to 6, is provided. The adjustment indicator 11 can be changed in an adjustment state. Furthermore, the adjustment indicator 11 can be coupled with the adjusting device 10.

The pipetting device 1 according to the invention has a coupling device 12 by means of which, in a state of use, the adjusting device 10 is coupled to the volume indicator 9 and uncoupled from the adjustment indicator 11, whereby an actuation of the adjusting device 10, in particular a rotation of the adjusting means 23 and/or of the adjustment sleeve 27 about the longitudinal axis L, causes a change in the volume indicator 9 but not in the adjustment indicator 11. In this connection, in the state of use as shown in FIG. 4, it is provided that the adjustment indicator 11 and the coupling device 12 are disengaged. The volume indicator 9 and the adjusting device 10 are engaged with the coupling device 12, thereby enabling coupling from the volume indicator 9 to the adjusting device 10.

The coupling device 12 is further designed to couple the adjusting device 10 to the adjustment indicator 11 and to decouple it from the volume indicator 9 in an adjustment state, whereby an actuation of the adjusting device 10, in particular a rotation of the adjusting means 23 and/or of the adjustment sleeve 27 about the longitudinal axis L, causes a change in the adjustment indicator 11 but not in the volume indicator 9. The pipetting device 1 according to the invention is shown in FIG. 5 in an adjustment state.

An actuation of the adjusting device 10 shown in the figures can be achieved by a force applied by the user or, for example, by a motor.

In the following, the structure and interaction of the coupling device 12 with the adjusting device 10, the adjustment indicator 11 and the adjusting device 10 according to a first embodiment according to FIGS. 3 to 10 are described.

In the illustrated and preferred embodiment, the adjusting device 10 is coupled to the upper stop 6 in the use state and in the adjustment state, whereby an actuation of the adjusting device 10—for example by an applied force—causes a change in the position of the upper stop 6. In particular, such a change in position is transmitted to the upper stop 6 by a force applied to the adjusting device 10.

In addition to the use state and the adjustment state, however, the pipetting device 1 can preferably also assume a further state, namely the so-called calibration state, which is shown in more detail in FIG. 6. In the calibration state, the adjusting device 10 is coupled to the volume indicator 9 and decoupled from the upper stop 6 and from the adjustment indicator 11, whereby an actuation of the adjusting device 10, in particular an actuation and/or a rotation of the adjusting means 23 and/or of the adjustment sleeve 27, causes a change in the volume indicator 9 but not in the adjustment indicator 11 and not in the position of the upper stop 6. FIG. 6 shows that the adjusting means 10 is coupled to the volume indicator 9, in particular by—at least in some areas—the coupling means 12 coupling the adjusting device 10 to the volume indicator 9, preferably by interlocking corresponding gear teeth. However, no coupling is provided between the adjusting device 10 and the adjustment indicator 11, in particular an adjustment toothing 11A of the adjustment indicator 11 is out of engagement with the coupling device 12.

A coupling between the adjustment indicator 11 and/or the volume indicator 9 and the adjusting device 10, in particular a toothing 28 of the adjusting device 10 and/or the adjustment sleeve 27, can be ensured via the coupling device 12.

In the state of use illustrated in FIG. 4, it is ultimately the case that a change in the volume indicator 9, in particular by rotating the adjusting means 23 and/or the adjustment sleeve 27 about the longitudinal axis L, resulting in a rotation of the volume indicator wheels 29 about an axis B which, in particular, is at least substantially parallel to the longitudinal axis L and/or forms a further longitudinal axis of the pipetting device 1, causes a change in the upper stop 6. This state of use is applied by the user when he wishes to obtain an adjustment and/or a variation of the volume to be pipetted and, consequently, of the stroke of the displacement device 2.

The adjustment state shown in FIG. 5 is ultimately set when the volume indicator 9 is to be adjusted to the actual pipetted volume. For example, due to the nature of the fluid to be pipetted and/or the external ambient conditions, there may be a deviation between the value indicated by the volume indicator 9 and the actually pipetted volume. Such a deviation can be “corrected” by means of the adjustment indicator 11. The adjustment value/adjustment value of the adjustment indicator 11 to be set can be determined in different ways. For example, certain adjustment values/adjustment values can be specified to the user according to known fluids and/or known ambient conditions, which are then set by the user at the adjustment indicator 11—preferably by turning the adjusting means 23 and/or the adjustment sleeve 27. In the adjustment state, it is then provided that the stroke of the displacement device 2 can be changed according to the adjustment value of the adjustment indicator 11.

In particular, the calibration state set in FIG. 6 is not set by the user. Such a calibration state can be set, for example, after manufacture in the manufacturing plant, if an “original calibration” and/or “original setting” of the pipetting device 1 is to be made. For example, a change in the adjusting device 10 may cause a change in the volume indicator 9, but no change in the position of the upper stop 6 is implemented and thus, in particular, the stroke of the displacement device 2 is not changed.

FIG. 6 shows a preferred embodiment in which the adjustment sleeve 27 has an internal toothing 27A and the upper stop 6 has an external toothing 6A. In the calibration state, axial displacement of the adjustment sleeve 27 separates its internal toothing 27A from the external toothing 6A. In the use and adjustment state, on the other hand, both internal teeth 27A and 6A are connected in a rotationally fixed manner.

In FIGS. 4 to 6, it can be seen that in the illustrated and preferred embodiment the coupling device 12 has at least one first coupling means 13 coupled to the adjusting device 10. The coupling of the adjusting device 10 with the first coupling means 13 (and thus the coupling device 12) is present in the use state as well as in the adjustment state as well as in the calibration state. In the illustrated and preferred embodiment example, the first coupling means 13 is formed as a first gear wheel 13.

In particular, the first coupling means 13 can be coupled to external teeth 28 of the adjusting device 10, wherein the external toothing 28 is arranged in particular on an outer side of the adjustment sleeve 27. In this case, the first coupling means 13 and the external toothing 28 of the adjustment sleeve 27 can functionally form a spur gear for driving the adjusting device 10.

The coupling device 12 further comprises at least one second coupling means 14 that can be coupled to the volume indicator 9, which is preferably formed as a second gear wheel 14 and is connected to the first coupling means 13 in a rotationally rigid manner The second coupling means 14 can be coupled to a corresponding toothing 9A of the volume indicator 9, wherein the toothing of the volume indicator 9 is arranged to be rotatable about the axis B. Thus, the toothing of the volume indicator 9 can form a spur gear with the second coupling means 14 in particular—and this in the state of use.

The coupling device 12 comprises at least one third coupling means 15 which can be coupled to the adjustment indicator 11, preferably formed as a third gear wheel 15 and connected to the first coupling means 13 in a torsionally rigid manner so as to prevent relative rotational movement between them. The third coupling means 15 forms a further spur gear in the meshing state and can be formed between the third coupling means 15 and an adjustment toothing 11A of the adjustment indicator 11 in the adjustment state. Thus, in the adjustment state, the teeth of the third gear and/or the third coupling means 15 can engage with the adjustment toothing 11A of the adjustment indicator 11.

In the illustrated and preferred embodiment example, it is provided that the first coupling means 13, the second coupling means 14 and the third coupling means 15 are arranged rotatably about a common axis A of the coupling device 12. The axis A runs in particular at least substantially parallel to the longitudinal axis L of the pipetting device 1 and/or to the (rotary) axis B and/or the axis A preferably forms a further longitudinal axis of the pipetting device 1 and/or of the coupling device 12.

In particular, the first coupling means 13, the second coupling means 14 and the third coupling means 15 are arranged to be displaceable along this common axis A.

In the embodiment shown in FIGS. 4 to 6, it is provided that the adjustment indicator 11 has at least one number wheel 11B that can be rotated about a longitudinal axis L of the pipetting device 1 and displays a scale for an adjustment value of the stroke of the displacement means 3. The number wheel 11B can in particular be designed in such a way that an indication of the adjustment value is visible from the outside, as shown in more detail in FIG. 3. For this purpose, the housing 1A can have an opening, for example. On the number wheel 11B of the adjustment indicator 11, the adjustment toothing 11A engageable with the third coupling means 15 can be arranged and/or formed.

FIG. 3 shows that the pipetting device 1 has an actuating element 16. In the illustrated and preferred embodiment example, the actuating element 16 is accessible from the outside, in particular for a user. The actuating element 16 is designed for adjusting the coupling device 12. Adjusting the coupling device 12 by means of the actuating element 16 enables a change between the use state and the adjustment state and vice versa. In particular, the actuating element 16 is arranged to be longitudinally displaceable and/or axially displaceable.

FIG. 3 shows that the housing 1A has a corresponding opening so that accessibility of the actuating element 16, which is arranged inside the housing 1A, is ensured. Alternatively or additionally, in further embodiments, the actuating element 16 may protrude or be flush with respect to the housing 1A.

FIGS. 4 to 6 show that the coupling device 12 preferably has an engagement means 17 for changing the position of the coupling device 12. In particular, the engagement means 17 is designed for axial displacement of the coupling device 12 along the axis A of the coupling device 12. In particular, the engagement means 17 can cooperate with the actuating element 16. Thus, the engagement means 17 may in particular be configured for transmitting the force applied to the actuating element 16 for axially moving the coupling device 12. Preferably, the engagement means 17 is movable along the longitudinal axis L of the pipetting device 1, in particular parallel to the longitudinal axis L of the pipetting device 1. In particular, the engagement means 17 is arranged in a rotationally fixed manner (not rotatable about the longitudinal axis L) in the preferred embodiment example shown in FIGS. 4 to 6. Preferably, the engagement means 17 is driven by the actuating element 16 and can be arranged in different end positions. In particular, a longitudinal displacement of the actuating element 16 causes a longitudinal displacement of the engagement means 17. The actuating element 16 can be moved by a user from a first (end) position, in which the coupling device 12 brings about the use state, along the longitudinal axis of the pipetting device 1 into a second (end) position, in which the coupling device 12 brings about the adjustment state. In FIGS. 4 and 5, two end positions of the engagement means 17 and the first as well as the second position of the actuating means 16 are shown, which respectively indicate the use and adjustment state.

The engagement means 17 can engage around at least one coupling means of the coupling device 12 for adjusting the coupling device 12, in particular the second coupling means 14, as shown in FIGS. 4 and 5. In particular, the engagement means 17 for engaging around the second coupling means 14 may be fork-shaped, at least in regions, and/or may form a receptacle for the second coupling means 14.

In the preferred embodiment shown in FIGS. 4 to 6, the engagement means 17 and the actuating element 16 are integrally designed with one another. Alternatively or additionally, it would also be possible for the engagement means 17 and the actuating element 16 to be firmly connected to one another, in particular in a rotationally fixed manner.

Figure 7:
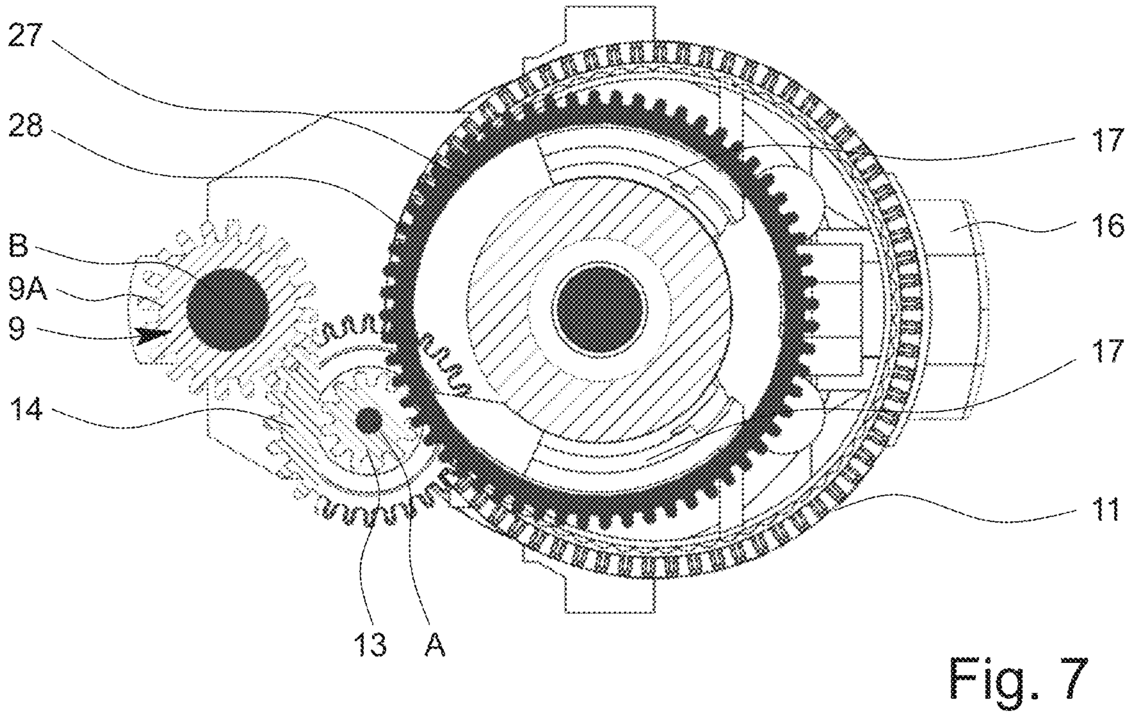
FIG. 7 is a schematic sectional view VII-VII of the pipetting device shown in FIG. 4 in a state of use.
Figure 8:
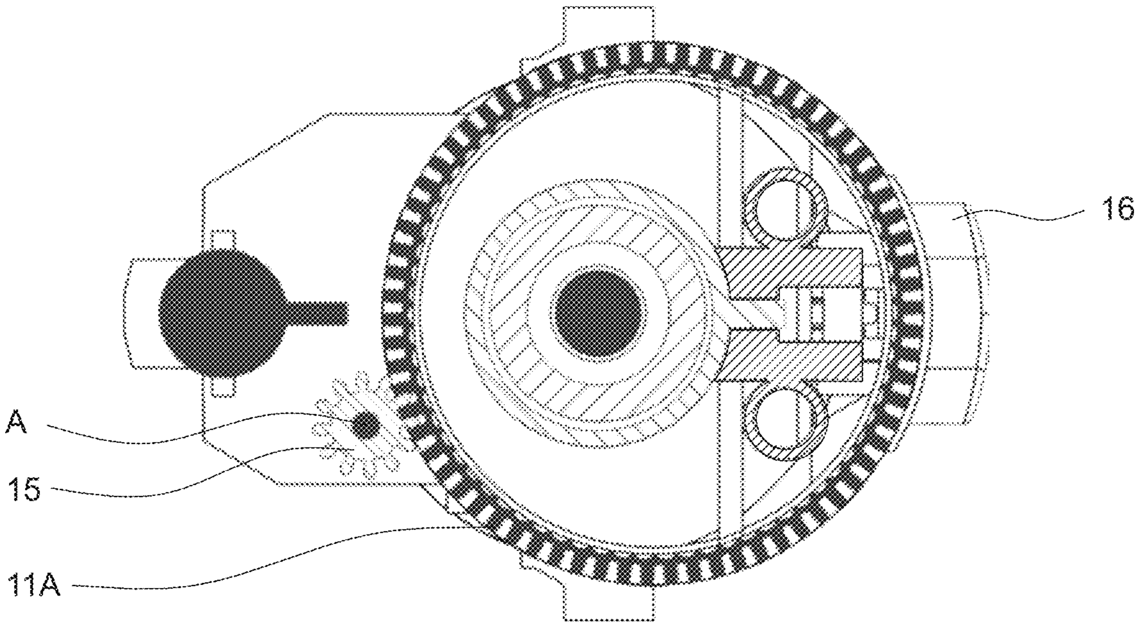
FIG. 8 is a schematic sectional view VIII-VIII of the pipetting device shown in FIG. 5 in an adjustment state.

FIGS. 7 and 8 show the respective spur gears in more detail. FIG. 7 shows the sectional view VII-VII of FIG. 4, whereas FIG. 8 shows the sectional view VIII-VIII of FIG. 5.

FIG. 7 shows that, in the state of use, a rotation of the adjusting means 23 and/or of the adjustment sleeve 27 with the external toothing 28 about the axis L causes a rotation of the first coupling means 13 (and thus of the second coupling means 14 and of the third coupling means 15), which in turn causes a rotation of the volume indicator 9. The volume indicator 9 is thus in engagement with the adjusting device 10. A movement of the adjusting device 10 also leads to a change in position of the upper stop 6 in the state of use.

FIG. 8 shows the adjustment state. FIG. 8 shows that the third coupling means 15 is engaged with the adjustment toothing 11A of the adjustment indicator 11. The rotation of the adjustment indicator 11 about the longitudinal axis L is caused by a rotation of the third coupling means 15 about the axis A, which in turn is caused by a rotation of the first coupling means 13. In FIG. 8, it is not shown in more detail that in the adjustment state the first coupling means 13 is also in engagement with and/or coupled to the external toothing 28 of the adjusting device 10. A movement of the adjusting device 10 also leads to a change in position of the upper stop 6 in the adjustment state.

Figure 9:
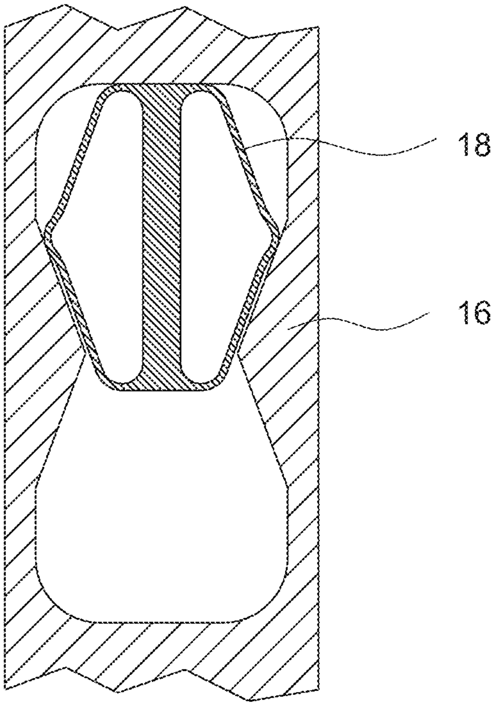
FIG. 9 is a schematic sectional view IX-IX of an actuating element shown in FIG. 5 in an adjustment state.
Figure 10:
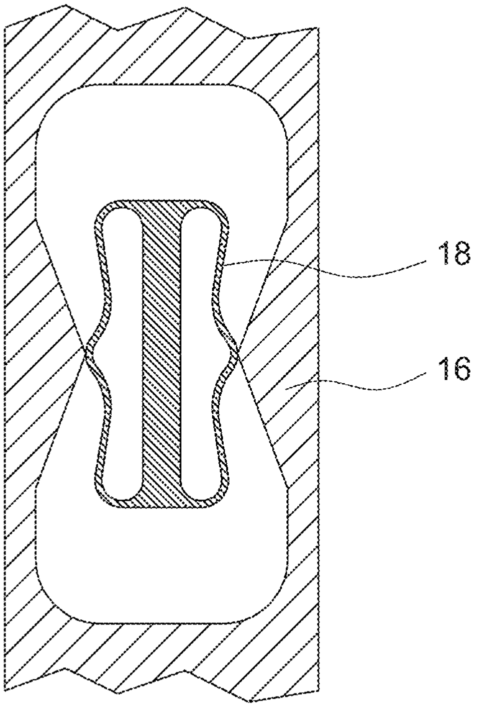
FIG. 10 is a schematic sectional view through a portion of the actuator shown in FIG. 9 in a further state.

FIGS. 9 and 10 show a preferred embodiment of the first embodiment of the pipetting device 1 described above. FIGS. 9 and 10 show a sectional view along IX-IX of FIG. 5. In FIGS. 9 and 10, it is shown that a spring means 18 of the pipetting device 1 is provided. The spring means 18 is configured such that the spring force of the spring means 18 of the pipetting device 1 acts on the actuating element 16 when moving between the end positions along a section. Preferably, the spring means 18 is arranged on the actuating element 16 and/or on the engagement means 17.

Figures 11, 12, 13:
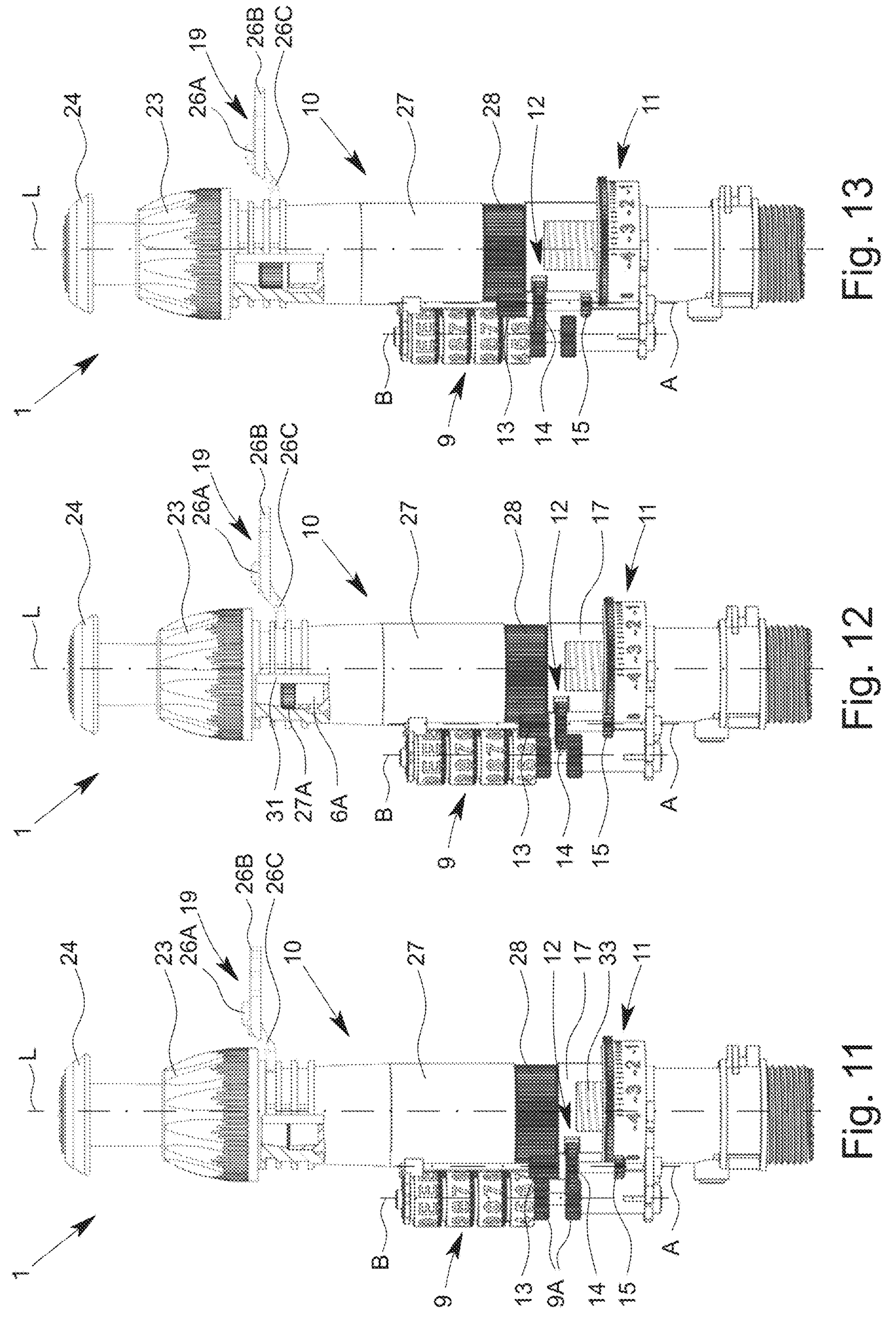
FIG. 11 is a schematic perspective view of a part of a second embodiment of a pipetting device according to the invention in a state of use.
FIG. 12 is a schematic perspective view of a part of the second embodiment of a pipetting device according to the invention in an adjustment state.
FIG. 13 is a schematic perspective view of a part of the second embodiment of a pipetting device according to the invention in a calibration state.

In FIGS. 11, 12 and FIG. 13, a further preferred embodiment of the pipetting device 1 is shown without the housing 1A. The embodiment shown in FIGS. 11, 12 and 13 differs from the embodiment shown in FIGS. 3 to 10 in that the actuating element 16 is now formed by the adjusting device 10, in particular the adjustment sleeve 27. However, the further basic and previously described mode of operation, in particular the coupling in the use state and/or in the adjustment state of the adjustment indicator 11 and/or of the volume indicator 9 with the adjusting device 10, does not differ at least essentially. Accordingly, reference may be made to the previous explanations regarding the mode of operation of the coupling device 12, which may also apply in the same way to the second embodiment described below.

FIG. 11 shows the use state, whereas FIG. 12 shows the adjustment state and FIG. 13 the calibration state.

As shown in FIGS. 11 to 13, in the second embodiment it is provided that the adjusting device 10 comprises and/or forms the actuating element 16 and/or additionally provides the function of the actuating element 16. In particular, the adjustment sleeve 27 forms the actuating element 16. Here, the adjustment sleeve 27 is designed to be rotatable about a longitudinal axis L of the pipetting device 1 for changing the stroke of the displacement means 3 and for changing the volume indicator 9 or the adjustment indicator 11. As an actuating element, the adjustment sleeve 27 is further movable along the longitudinal axis L of the pipetting device 1 for adjusting the coupling device 12 to the use state, adjustment state and/or calibration state, as previously described by means of FIGS. 4 to 6 and referred to.

In FIGS. 11 to 13, three different axial positions or settings of the adjustment sleeve 27 are shown. In particular, the adjustment sleeve 27 can be releasably fixed in the axial positions shown by a holding device 19 of the pipetting device 1. In particular, the holding device 19 may comprise an actuating button 26A, a bending spring 26B and a detent 26C. The adjustment sleeve 27 can be moved along the longitudinal axis L of the pipetting device 1 by means of the holding device 19 and fixed in one of several grooves by engaging the detent 26C.

Preferably, the adjustment sleeve 27 and the engagement means 17 are rotatably mounted against each other and/or longitudinally displaceably connected.

The engagement means 17 is preferably in the second embodiment biased against the adjustment sleeve 27 by means of spring action, in particular by means of a compression spring 33 and/or has the spring means 18.

The spring means 18 in the second embodiment is not shown in FIGS. 11 to 13 and has an additional middle position located between the end positions. These three positions correspond to the axial displacement of the adjustment sleeve 27 and the fixation by the holding device 19 in the use, adjustment and calibration state as described previously with reference to FIGS. 4 to 6.

In the following, a third preferred embodiment of the pipetting device 1 is described, which is shown in FIGS. 14 to 20 and is in particular a particularly preferred embodiment of the first embodiment of the pipetting device 1 according to FIGS. 4 to 6. Compared to the embodiment shown in FIGS. 4 to 6, adjustment sleeve 27 and/or engagement means 17 has a coupling element 20 which blocks the rotation of adjustment sleeve 27 and/or adjustment means 23 during switching from the use state to the adjustment state or vice versa.

Figure 15:
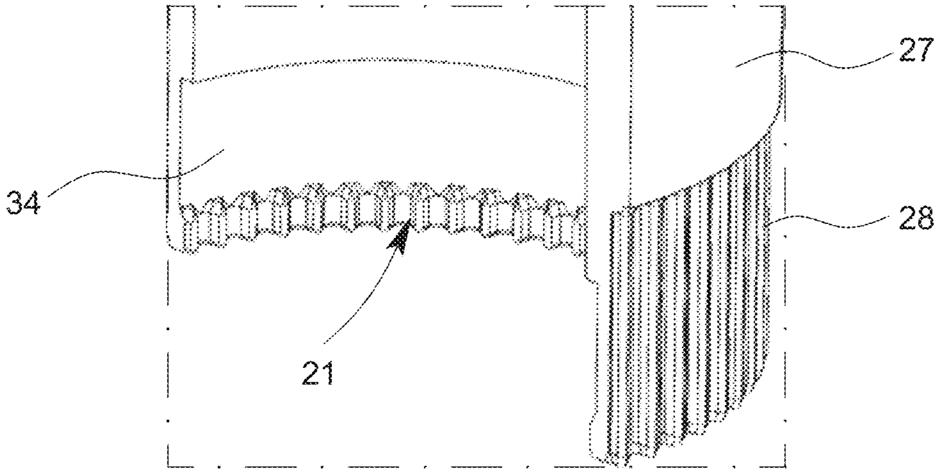
FIG. 15 is a schematic perspective view of a section of an adjustment sleeve according to the invention for a pipetting device according to the third embodiment.
Figure 16:
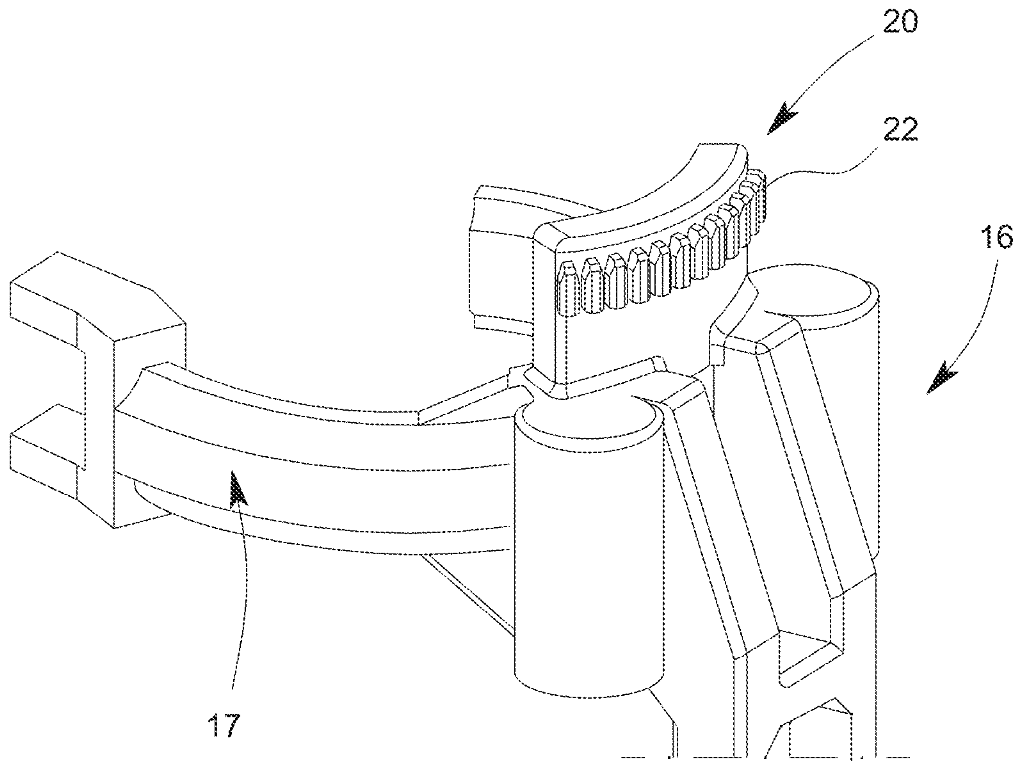
FIG. 16 is a schematic perspective view of a section of an engagement means for a pipetting device according to the third embodiment.

As shown in FIG. 16, the coupling element 20 may comprise teeth 22 for this purpose. The adjusting device 10, in particular the adjustment sleeve 27, can have, preferably on the inside—i.e., facing away from the housing 1A—a counter-coupling element 21, as shown in FIG. 15. The coupling element 20, in particular the teeth 22, can be coupled to and decoupled from the counter-coupling element 21.

Figure 14:
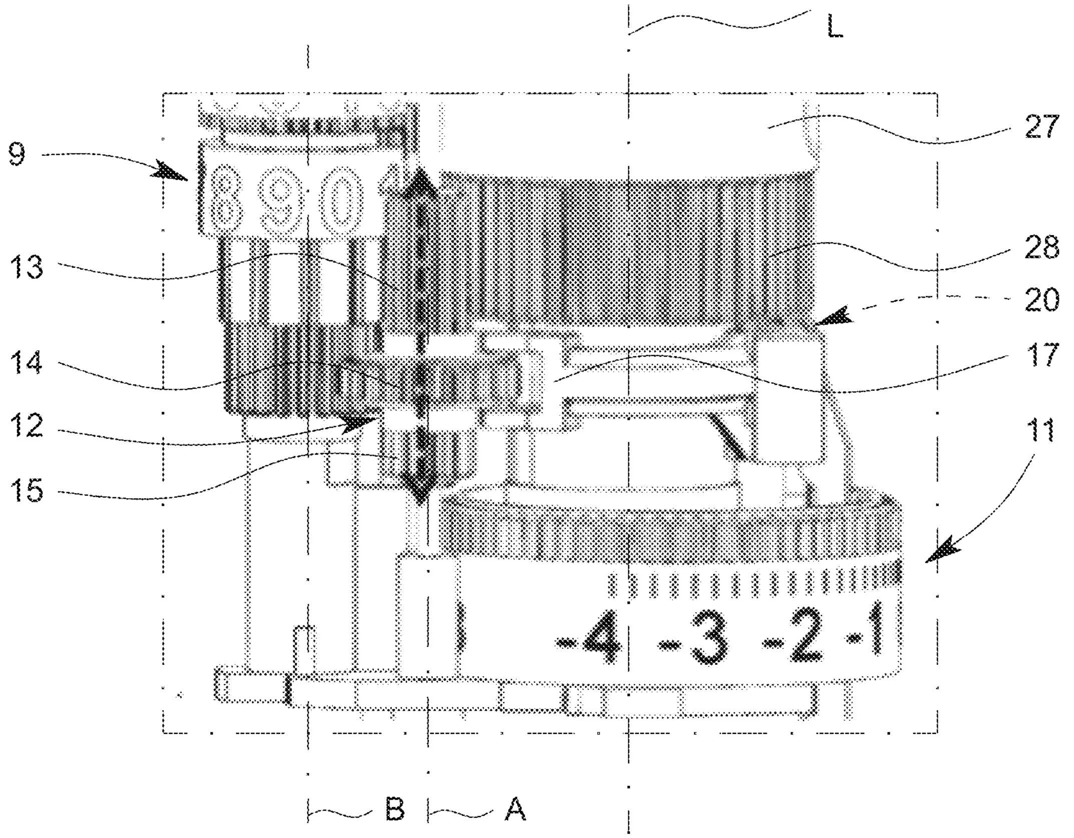
FIG. 14 is a schematic perspective view of a section of a pipetting device according to the invention in a third embodiment in a state of use.

FIG. 15 shows the adjustment sleeve 27 with the counter-coupling element 21 and a groove 34. FIG. 14 shows the third preferred embodiment of the pipetting device 1 in the state of use and with a rotatable adjusting device 10, adjustment sleeve 27, coupling element 12 and volume indicator 9. In the state of use, the teeth 22 are located inside the groove 34, which allows the adjustment sleeve 27 to be rotated. The coupling element 20 is here decoupled from the counter-coupling element 21.

FIGS. 17 to 20 show in more detail the operation of the coupling between the coupling element 20 and the counter-coupling element 21 during switching, starting from the state of use shown in FIG. 14. FIGS. 17 to 20 show the states I to IV, with the states differing from one another by axially different positions of the adjustment sleeve 27.

Finally, the coupling element 20 and the counter-coupling element 21 are formed in such a way that a rotational movement of the adjusting device 10 can be blocked during the transition from the use state to the adjustment state and/or from the adjustment state to the use state. This is particularly advantageous in that unwanted hooking and rotation during switching between the adjusting device 10 and the coupling device 12 can be prevented. Ultimately, a securing of the adjusting device 10 during switching or during the transition from the use state to the adjustment state can be achieved and/or vice versa.

Figure 17:
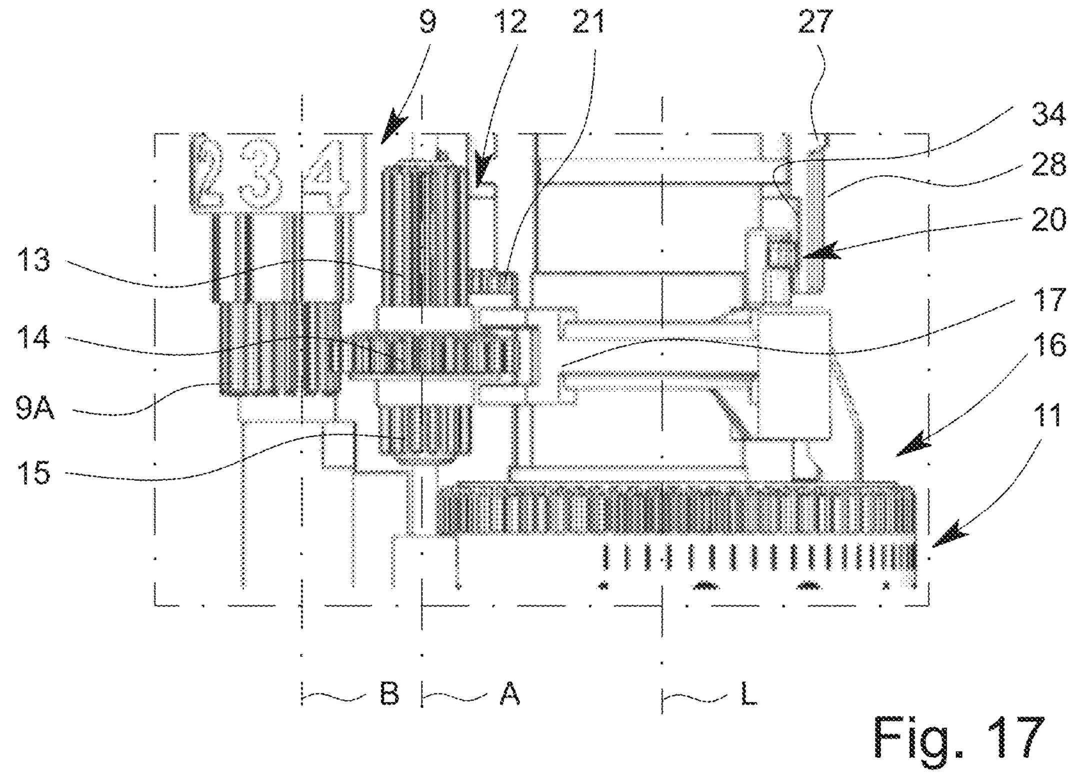
FIG. 17 is a schematic perspective view of a section of a pipetting device according to the third embodiment in a state of use.

FIG. 17 shows that in the state of use (state I), the coupling element 20 is not yet engaged with the counter-coupling element 21. In particular, the teeth 22 of the coupling element 20 do not engage with the counter-coupling element 21.

Figure 18:
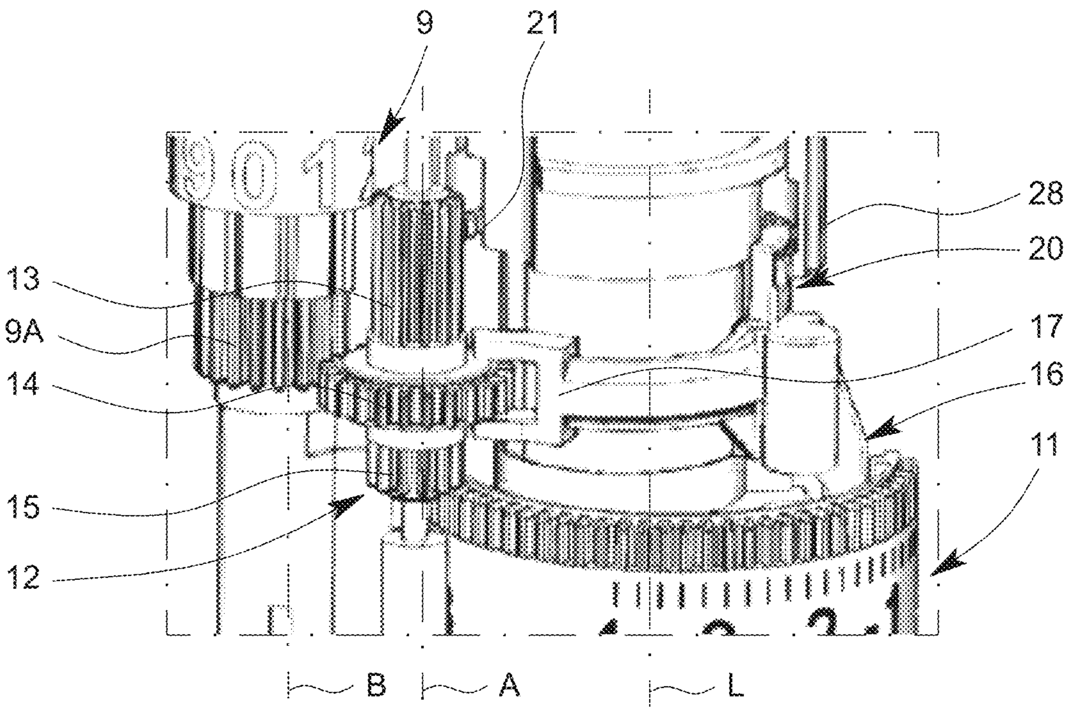
FIG. 18 is a schematic perspective view of a section of a pipetting device according to the third embodiment in a first switching state.

However, if a switching from the use state to the adjustment state is initiated due to a downward actuation of the adjustment sleeve 27 in the embodiment shown, a longitudinal displacement of the adjustment sleeve 27 results, as shown in FIG. 18 as the first switching state (state II). During this switching, the coupling element 20 is thus brought into engagement with the counter-coupling element 21, with the second coupling means 14 and the volume indicator 9 initially still in engagement and coming out of engagement upon further longitudinal displacement of the adjustment sleeve 27. In this state, a rotational movement, preferably about the longitudinal axis L, of the adjusting device 10, in particular of the adjustment sleeve 27 and/or the adjusting means 23, is blocked.

Figure 19:
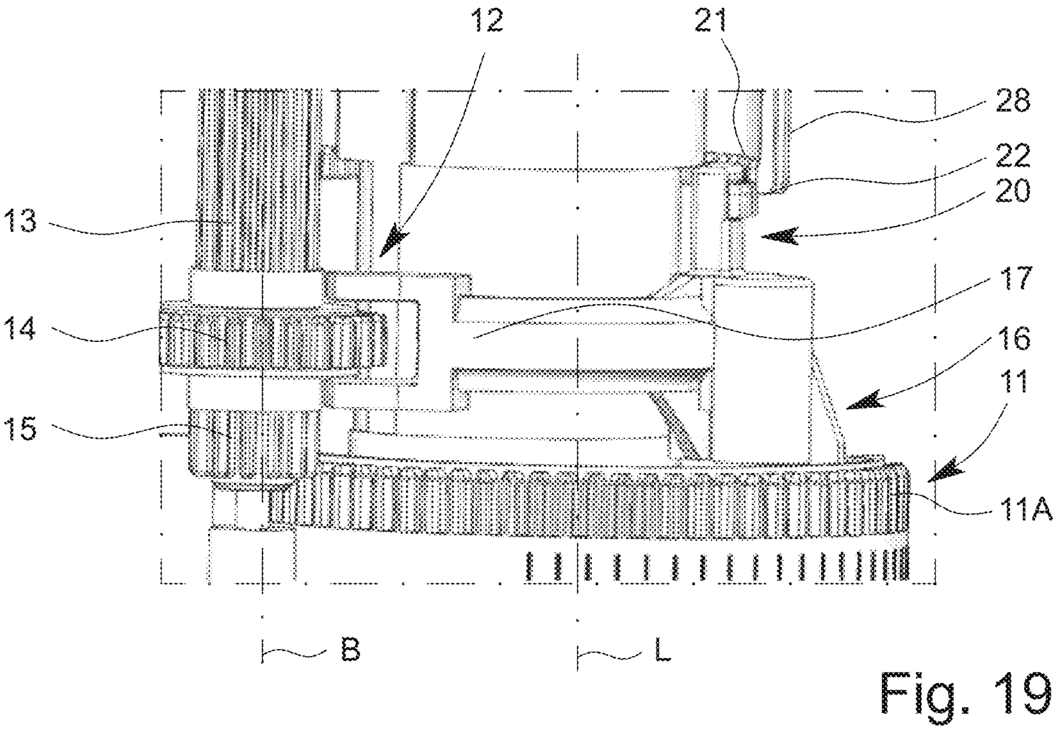
FIG. 19 is a schematic perspective view of a section of a pipetting device according to the third embodiment in a second switching state.

FIG. 19 shows the second switching state (state III), wherein for further transfer to the adjustment state, the engagement means 17 and the adjustment sleeve 27 are further displaced in the direction of the shaft 30, wherein the coupling element 20 and the counter-coupling element 21 continue to engage and the gears 15 and 11 engage.

Figure 20:
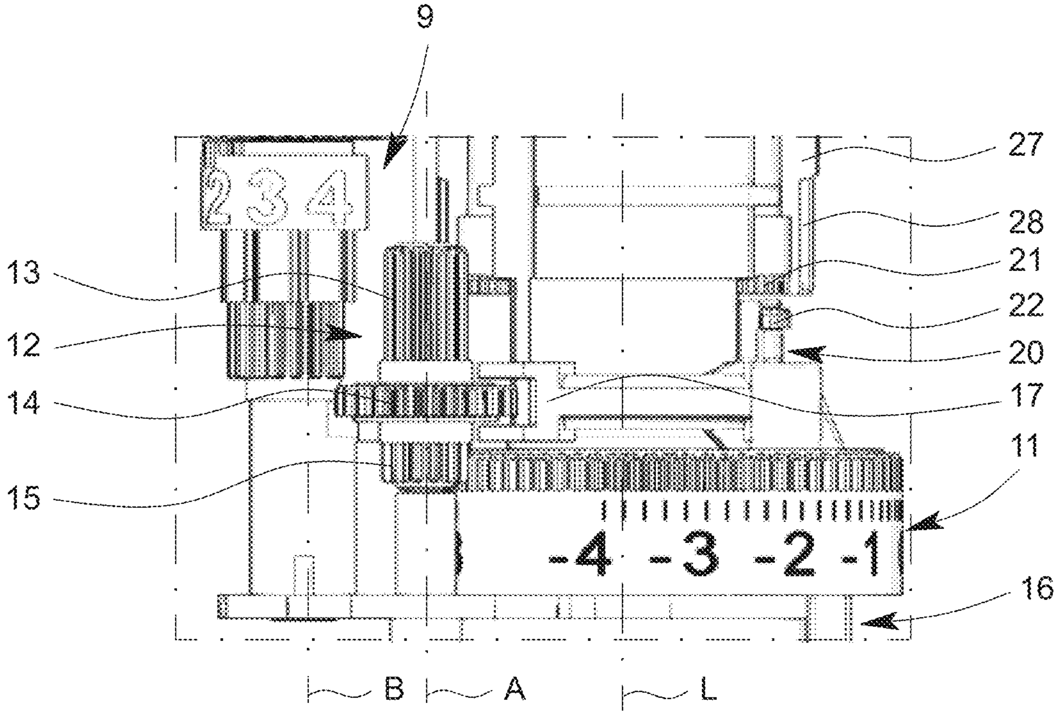
FIG. 20 is a schematic perspective view of a section of a pipetting device according to the third embodiment in an adjustment state.

FIG. 20 then shows the adjustment state (state IV), illustrating that in the adjustment state, rotational movement of the adjusting device 10 is again ensured because the coupling element 20 and the counter-coupling element 21 are no longer engaged and the adjusting device 10, preferably the adjusting means 23, is ultimately no longer blocked and the adjustment indicator 11 can be driven by the gear wheel 15.

Thus, only in the switching state or in the transition from the use state to the adjustment state and/or from the adjustment state to the use state is a blocking of the rotary movement of the adjusting device 10, preferably of the adjusting means 23, provided.

Figure 21:
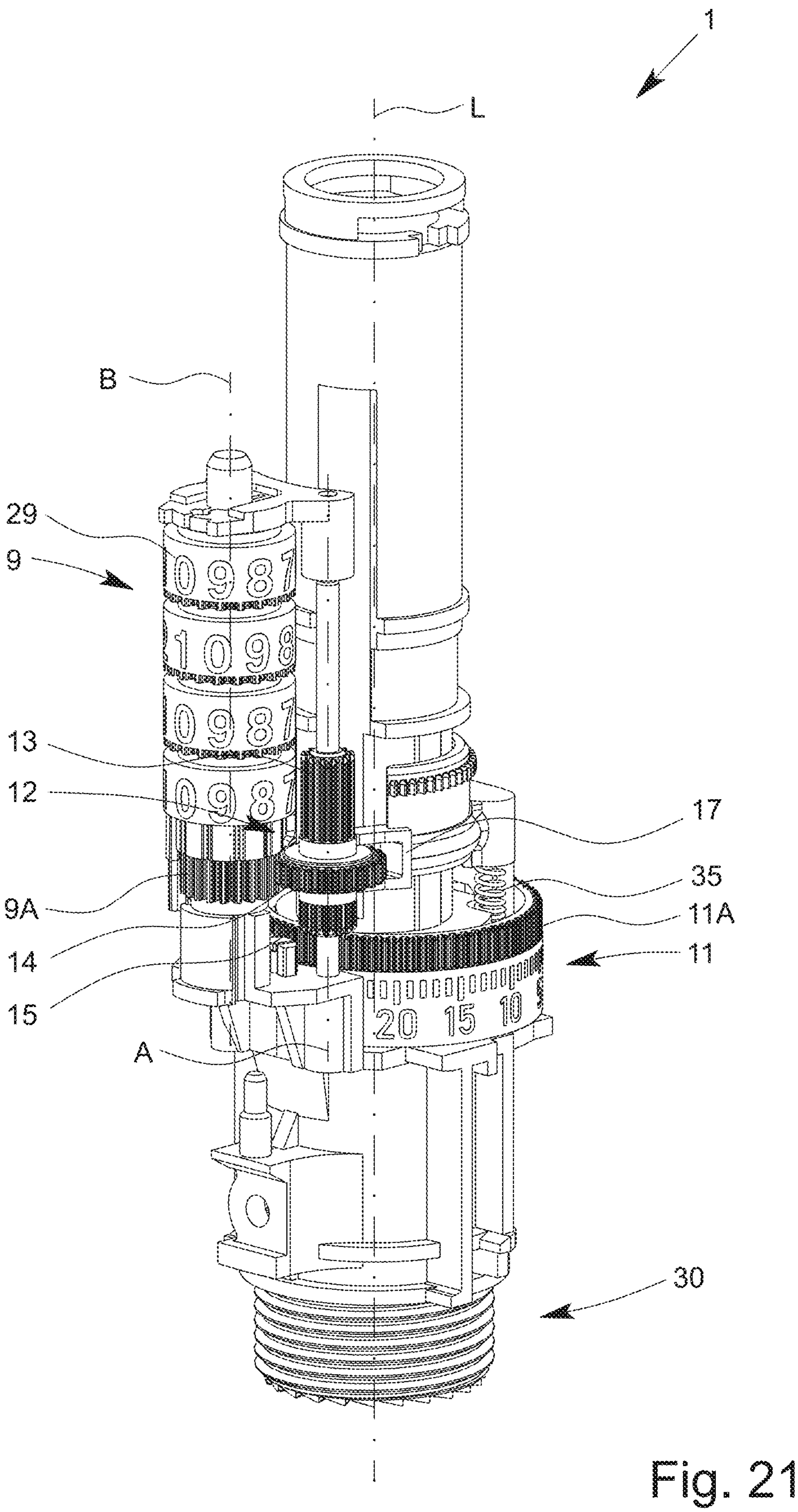
FIG. 21 is a schematic perspective view of a section of a fourth embodiment of a pipetting device according to the invention, with parts of the pipetting device being omitted.

FIG. 21 shows a further embodiment of a pipetting device 1 according to the invention, which illustrates an alternative to the embodiment shown in FIGS. 3 to 10. FIG. 21 shows a schematic perspective view of a section of a fourth embodiment of a pipetting device 1 according to the invention, with parts of the pipetting device 1 being omitted.

In the embodiment shown in FIG. 21, the actuating element 16 is designed separately from the adjusting device 10. The engagement means 17 and the actuating element 16 are fixedly connected to one another.

The actuating element 16 is designed to adjust the coupling device 10. The actuating element 16 is accessible from the outside for a user of the pipetting device 1. The actuating element 16 is arranged to be longitudinally displaceable, that is to say displaceable along the longitudinal axis L of the pipetting device 1. The actuating element 16 is designed in such a way that the adjustment of the coupling device 10 by means of the actuating element 16 enables a change between the use state and the adjustment state. In particular, a longitudinal displacement of the actuating element 16 causes a longitudinal displacement of the engagement means 17. The actuating element 16 is moved by a user along the longitudinal axis L of the pipetting device 1 from a first position, in which the coupling device 10 brings about the use state, to a second position, in which the Coupling device 10 causes the adjustment state.

In this embodiment it is provided that a restoring force of a restoring means 35 of the pipetting device 1 acts on the actuating element 16 and on the engagement means 17. The restoring force of the restoring means 35 counteracts a displacement of the actuating element 16 from the first position (use state) into the second position (adjustment state). If the user does not exert any force on the actuating element in the second position (e.g., if the user releases the actuating element), the restoring force of the restoring means 35 causes a longitudinal displacement of the actuating means 16 from the second position into the first position. Here, the engagement means 17 is displaced together and concurrently with the actuating element 16.

Figure 22:
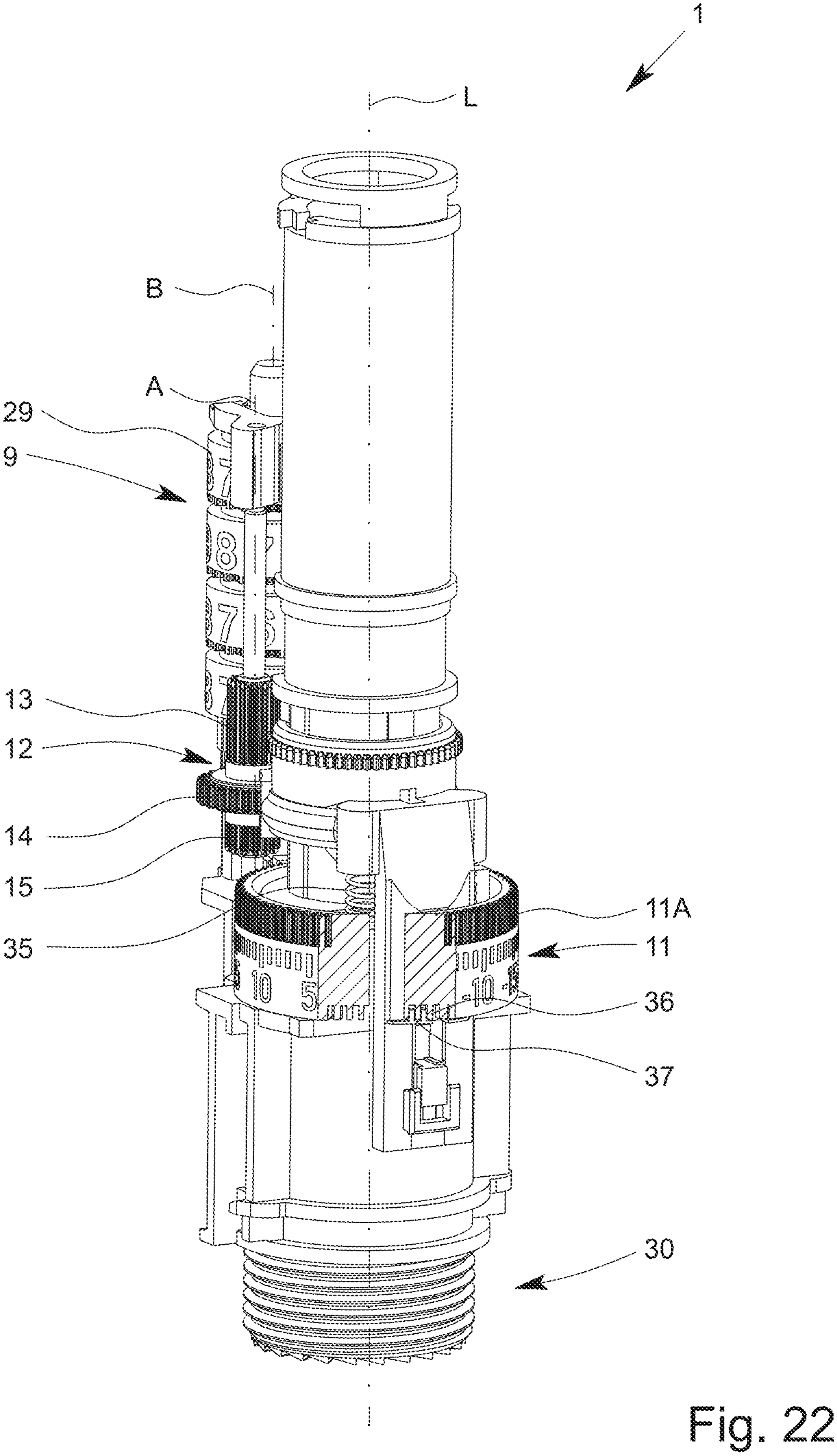
FIG. 22 is a schematic perspective view of a section of a pipetting device according to the invention in a use state according to a fifth embodiment, with parts of the pipetting device being omitted, and FIG. 23 the pipetting device according to FIG. 22 in an adjustment state.

FIG. 22 shows a schematic perspective view of a section of a pipetting device 1 according to a fifth embodiment of the invention, with parts of the pipetting device 1 being omitted. The pipetting device 1 is shown here in the use state. In this use state, the adjustment indicator 11 is decoupled from the adjusting device 10 and is not engaged with the coupling device 12. In this use state, adjustment of the adjustment indicator 11 is to be avoided. For this purpose, it is provided here that the adjustment indicator 11 is fixed in the use state, in particular secured against rotation about the longitudinal axis L of the pipetting device. For this purpose, the adjustment indicator 11 has a locking toothing 36, here on an inner side of the adjustment indicator 11, and the actuating element 16 has locking toothing 37 complementary thereto, here on an outer side of the actuating element 16. The actuating element 16 can be moved along the longitudinal axis L of the pipetting device 1 to change from the use state to the adjustment state and vice versa. The actuating element 16 is non-rotatable in relation to the longitudinal axis L of the pipetting device 1 and cannot be rotated in the circumferential direction of the pipetting device 1, i.e. about the longitudinal axis L. By actuating the actuating element 16, the locking toothing 37 of the actuating element 16 and the locking toothing 36 of the adjustment indicator 11 can be engaged and disengaged. In the use state, the locking toothing 37 of the actuating element 16 is in engagement with the locking toothing 36 of the adjustment indicator 11. In this use state, this engagement prevents adjustment of the adjustment indicator 11, in particular rotation of the adjustment indicator 11 about the longitudinal axis L of the pipetting device 1. This engagement can be seen in FIG. 22.

Figure 23:
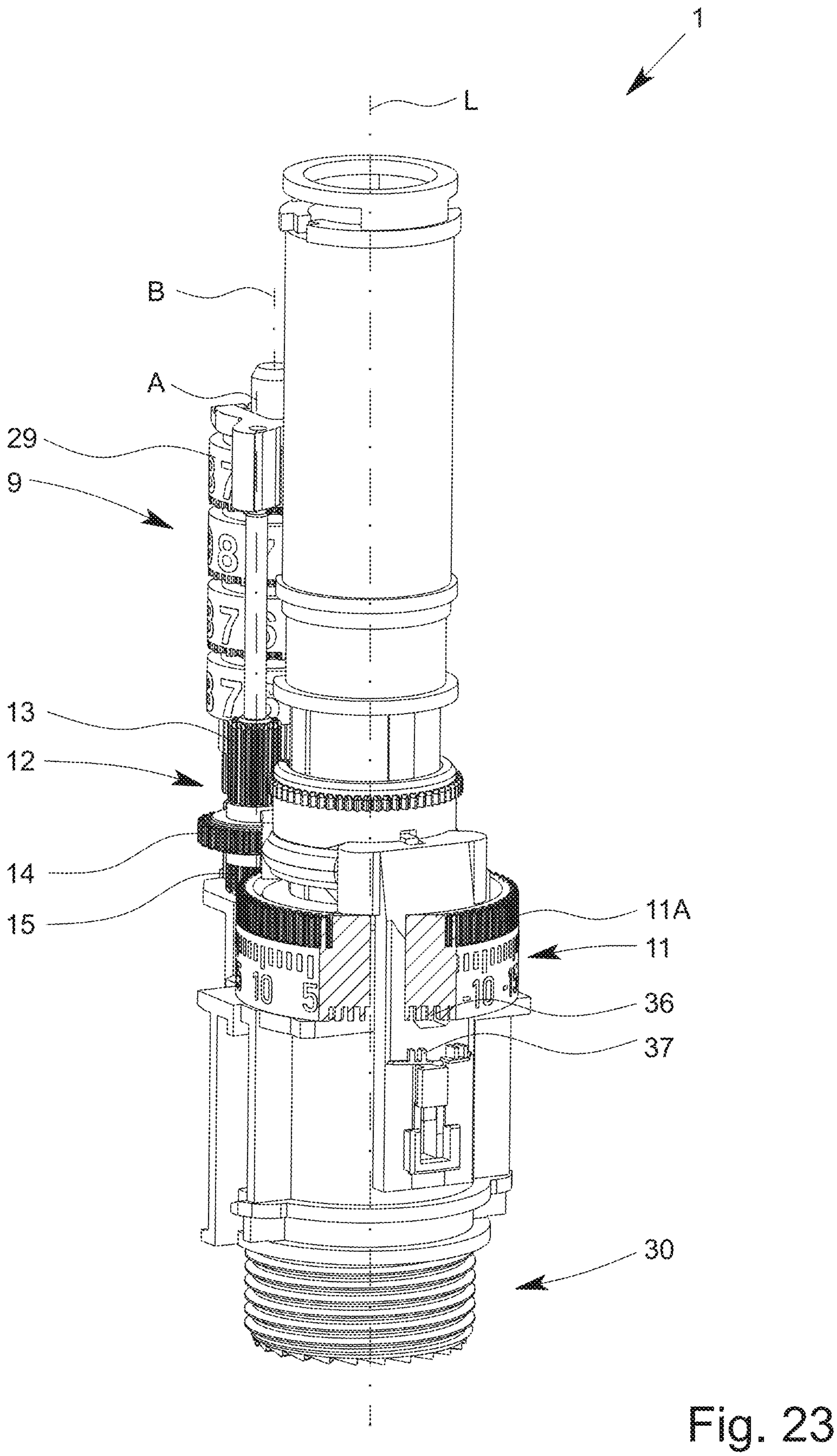

FIG. 23 shows a schematic perspective view of the pipetting device 1 according to FIG. 22 in the adjustment state. If the actuating element 16 is switched from the (first) position of the use state (see FIG. 22) to the (second) position of the adjustment state (see FIG. 23) by actuating, in particular shifting, the locking toothing 37 of the actuating element 16 and the locking toothing 36 of the adjustment indicator 11 get disengaged. In the adjustment state, the adjustment indicator 11 can be adjusted, in particular rotated about the longitudinal axis L of the pipetting device 1.

Individual aspects of the invention described above may be implemented independently, but may also be implemented and advantageous in any combination.

What is claimed is:

1. A pipetting device for taking up and dispensing fluid volumes, comprising:

- a displacement apparatus having a displacement device and a displacement housing,
- a drive device for moving the displacement device in the displacement housing,
  - wherein movement of the displacement device is limited by an upper stop, a lower stop and at least one counter stop of the drive device, so that a stroke of the displacement device is defined,
- a volume indicator for displaying a pipetting volume associated with the stroke of the displacement device and/or correlated with the stroke of the displacement device,
- an adjusting device to change the stroke of the displacement device,
- an adjustment indicator for indicating an adjustment value of the stroke of the displacement device, and
- a coupling device which
  - in a use state couples the adjusting device to the volume indicator and decouples the adjusting device from the adjustment indicator, whereby an actuation of the adjusting device causes a change of the volume indicator but not of the adjustment indicator, and
  - in an adjustment state couples the adjusting device to the adjustment indicator and decouples the adjusting device from the volume indicator, whereby an actuation of the adjusting device causes a change of the adjustment indicator but not of the volume indicator.

2. Pipetting device according to claim 1, wherein the displacement device is a piston and the displacement housing is a cylinder.

3. Pipetting device according to claim 1, wherein the adjusting device is configured to change the stroke of the displacement device by changing the position of the upper stop.

4. Pipetting device according to claim 3, wherein, in the use state and in the adjustment state, the adjusting device is coupled to the upper stop, whereby an actuation of the adjusting device causes a change in the position of the upper stop, wherein a force exerted on the adjusting device is transmitted to the upper stop.

5. Pipetting device according to claim 1, wherein, in a calibration state, the adjusting device is coupled to the volume indicator and decoupled from the upper stop and from the adjustment indicator, whereby an actuation of the adjusting device causes a change of the volume indicator but not of the adjustment indicator and not of the position of the upper stop.

6. Pipetting device according to claim 1, wherein the coupling device comprises:

at least one first gear wheel coupled to the adjusting device, at least one second gear wheel which can be coupled to the volume indicator, and at least one third gear wheel which can be coupled to the adjustment indicator, wherein the first, second and third gear wheels are arranged to rotate about a common axis and to be displaced along said common axis.

7. Pipetting device according to claim 1, wherein the adjustment indicator comprises at least one numerical wheel that is rotatable about a longitudinal axis of the pipetting device and that indicates a scale for an adjustment value of the stroke of the displacement device.

8. Pipetting device according to claim 1, wherein the pipetting device further comprises an externally accessible actuating element for adjusting the coupling device, wherein adjusting of the coupling device by the actuating element enables a change between the use state and the adjustment state.

9. Pipetting device according to claim 8, wherein the actuating element is formed separately from the adjusting device.

10. Pipetting device according to claim 8, wherein the adjusting device comprises the actuating element.

11. Pipetting device according to claim 8, wherein an adjustment sleeve of the adjusting device forms the actuating element, and wherein the adjustment sleeve is rotatable about a longitudinal axis of the pipetting device for changing the stroke of the displacement device and for changing the volume indicator.

12. Pipetting device according to claim 8, wherein an adjustment sleeve of the adjusting device forms the actuating element and wherein the adjustment sleeve is movable along the longitudinal axis of the pipetting device for adjusting the coupling device into the use state and/or adjustment state.

13. Pipetting device according to claim 8, wherein an adjustment sleeve of the adjusting device forms the actuating element and wherein the adjustment sleeve is releasably fixable in axially different positions by a holding device of the pipetting device.

14. Pipetting device according to claim 8, wherein the coupling device has an engagement means for axial displacement of the coupling device along the common axis of the coupling device, and wherein the engagement means is movable along a longitudinal axis of the pipetting device.

15. Pipetting device according to claim 14, wherein the engagement means is arrangeable in different end positions driven by the actuating element.

16. Pipetting device according to claim 14, wherein the engagement means embraces a second coupling means at least in regions.

17. Pipetting device according to claim 14, wherein the engagement means and the actuating element are made in one piece.

18. Pipetting device according to claim 14, further comprising a spring means for exerting a spring force that acts on the actuating element when moving between end positions along a partial path, and wherein the spring means is arranged on the actuating element and/or on the engagement means.

19. Pipetting device according to claim 14, wherein an adjustment sleeve of the adjusting device forms the actuating element, and wherein the adjustment sleeve is rotatable about a longitudinal axis of the pipetting device for changing the stroke of the displacement device and for changing the volume indicator, and wherein the adjustment sleeve and the engagement means are mounted to rotate relative to each other and/or to be longitudinally displaceably together.

20. Pipetting device according to claim 14, wherein, for coupling the engagement means to the adjusting device, the engagement means comprises a coupling element and the adjustment means comprises a counter-coupling element, wherein the coupling element and the counter-coupling element are configured to block a rotational movement of the adjusting device during a transition from the use state to the adjustment state and/or from the adjustment state to the use state.

* * * * *